(12) United States Patent
Sakai

(10) Patent No.: US 9,571,309 B1
(45) Date of Patent: Feb. 14, 2017

(54) DECISION FEEDBACK EQUALIZER AND RECEIVER CIRCUIT

(71) Applicant: FUJITSU LIMITED, Kawasaki-shi, Kanagawa (JP)

(72) Inventor: Yasufumi Sakai, Fuchu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/200,626

(22) Filed: Jul. 1, 2016

(30) Foreign Application Priority Data

Aug. 21, 2015 (JP) .................................. 2015-163559

(51) Int. Cl.
*H04L 25/03* (2006.01)
*H04L 12/26* (2006.01)
*H04J 11/00* (2006.01)
*H04W 72/04* (2009.01)

(52) U.S. Cl.
CPC ...... *H04L 25/03057* (2013.01); *H04J 11/0023* (2013.01); *H04L 25/03006* (2013.01); *H04L 43/16* (2013.01); *H04W 72/0453* (2013.01)

(58) Field of Classification Search
CPC .................... H04L 25/03006; H04L 25/03019; H04L 25/03057; H04L 43/16; H04J 11/0023; H04W 72/0453
USPC ........ 375/232, 233, 346, 348, 350; 708/322, 708/323
See application file for complete search history.

(56) References Cited

U.S. PATENT DOCUMENTS

| 2004/0203559 A1* | 10/2004 | Stojanovic ............ H04L 25/063 455/403 |
| 2008/0069199 A1* | 3/2008 | Chen ................. H04L 25/03057 375/233 |
| 2011/0116806 A1* | 5/2011 | He ..................... H04L 25/03019 398/158 |

(Continued)

FOREIGN PATENT DOCUMENTS

| JP | 5-52691 | 3/1993 |
| JP | 2013-153313 | 8/2013 |

OTHER PUBLICATIONS

Sam Palermo, "ECEN689: Special Topics in High-Speed Links Circuits and Systems Spring 2010", Texas A&M University, (search was conducted on Jul. 28, 2015), <URL:http://www.ece.tamu.edu/~spalermo/ecen689/lecture19_ee689_rx_dfe_eq.pdf> (19 pages).

(Continued)

*Primary Examiner* — Young T Tse
(74) *Attorney, Agent, or Firm* — Fujitsu Patent Center

(57) ABSTRACT

A plurality of comparator circuits output results of comparing a pulse amplitude modulated input signal having four or more values with a plurality of first thresholds. A selection section decides a value of the input signal at certain timing by selecting one of the comparison results on the basis of a result of deciding a value of the input signal at previous timing. A threshold setting section generates the first thresholds from a plurality of third thresholds obtained by adding an offset value based on magnitude of inter-symbol interference corresponding to each value to one of second thresholds whose number is based on the number of values, on the basis of an average value of third thresholds greater than a second threshold or third thresholds smaller than the second threshold and an adjustment value based on the (Continued)

decision result and sets the first thresholds in the comparator circuits.

5 Claims, 22 Drawing Sheets

(56) References Cited

U.S. PATENT DOCUMENTS

2016/0065396 A1* 3/2016 Chan ................ H04L 25/03057
375/233

OTHER PUBLICATIONS

R. Payne et al., "A 6.25-Gb/s Binary Transceiver in 0.13-um CMOS for Serial Data Transmission Across High Loss Legacy Backplane Channels", IEEE Journal of Solid-State Circuits, vol. 40, No. 12, Dec. 2005, pp. 2646-2657 (12 pages).

Peter Park, "A 4PAM/2PAM Coaxial Cable Receiver Analog Front-End Targeting 40Gb/s in 90-nm CMOS", A Thesis submitted in conformity with the requirements for the degree of Master of Applied Science Graduate Department of Electrical and Computer Engineering University of Toronto, (search was conducted on Jul. 28, 2015), <URL:http://tspace.library.utoronto.ca/bitstream/1807/11160/1/Park_Peter_200806_MASc_thesis.pdf> (113 pages).

Nathan Tracy et al., "Evolution of System Electrical Interfaces Towards 400G Transport", Optical Internetworking Forum (OIF), Sep. 23, 2013 (21 pages).

* cited by examiner

| IN | OUT | | |
|---|---|---|---|
| | s1 | s2 | s3 |
| 3 | 1 | 1 | 1 |
| 2 | −1 | 1 | 1 |
| 1 | −1 | −1 | 1 |
| 0 | −1 | −1 | −1 |

FIG. 3

|     | OUT |    |    |    |    |    |    |
| --- | --- | --- | --- | --- | --- | --- | --- |
| IN  | s1 | s2 | s3 | s4 | s5 | s6 | s7 |
| 7   | 1  | 1  | 1  | 1  | 1  | 1  | 1  |
| 6   | -1 | 1  | 1  | 1  | 1  | 1  | 1  |
| 5   | -1 | -1 | 1  | 1  | 1  | 1  | 1  |
| 4   | -1 | -1 | -1 | 1  | 1  | 1  | 1  |
| 3   | -1 | -1 | -1 | -1 | 1  | 1  | 1  |
| 2   | -1 | -1 | -1 | -1 | -1 | 1  | 1  |
| 1   | -1 | -1 | -1 | -1 | -1 | -1 | 1  |
| 0   | -1 | -1 | -1 | -1 | -1 | -1 | -1 |

FIG. 12

DECISION FEEDBACK EQUALIZER AND RECEIVER CIRCUIT

CROSS-REFERENCE TO RELATED APPLICATION

This application is based upon and claims the benefit of priority of the prior Japanese Patent Application No. 2015-163559, filed on Aug. 21, 2015, the entire contents of which are incorporated herein by reference.

FIELD

The embodiments discussed herein are related to a decision feedback equalizer and a receiver circuit.

BACKGROUND

In recent years the performance (such as bandwidth) of parts, such as processors, included in information processing systems, such as servers and computers, have improved significantly. In order to widen the total bandwidth of an entire information processing system, it is desirable to use a high-speed transmitter-receiver circuit which transmits and receives data between parts such as processors. In order to compensate for data signal degradation which occurs in a communication channel, an equalizer is used in a receiver circuit which performs high-speed data communication.

A direct feedback decision feedback equalizer (DFE) is known as one of equalizers. This DFE adjusts a decision threshold in a comparator circuit which decides a value of an input signal by offset voltage corresponding to an amount of signal degradation that occurs due to a past value of the input signal as a result of inter-symbol interference (ISI) to compensate for the signal degradation. In order to compensate for the input signal every bit, the decision threshold in the comparator circuit is changed every time corresponding to the width of 1-bit data (unit interval (UI)).

However, a circuit, such as a current adder, having long delay time is used as an offset voltage application circuit included in a feedback loop of a direct feedback DFE. Accordingly, if a UI becomes shorter with an increase in data rate, it is difficult to make delay time of the feedback loop shorter than or equal to a UI.

On the other hand, a speculative DFE is known as a DFE in which delay time of a feedback loop is short. With a speculative DFE, offset voltage corresponding to an ISI is given in advance to an input signal whose value is to be decided by a comparator circuit and one of a plurality of signals whose values are decided by comparator circuits is selected and outputted by a selection circuit according to a decision result of a past value. By doing so, signal degradation is compensated for. Usually delay time of a selection circuit is shorter than delay time of an offset voltage application circuit used in a direct feedback DFE. As a result, delay time of a feedback loop of a speculative DFE is short compared with a direct feedback DFE.

Sam Palermo, "ECEN689: Special Topics in High-Speed Links Circuits and Systems Spring 2010", Texas A&M University, (search was conducted on Jul. 28, 2015), <URL: www.ece.tamu.edu/~spalermo/ecen689/lecture19_ee689_rx_dfe_eq.pdf>

R. Payne et al, "A 6.25-Gb/s Binary Transceiver in 0.13-um CMOS for Serial Data Transmission Across High Loss Legacy Backplane Channels," JSSC, vol. 40, no. 12, December 2005, pp. 2646-2657

Peter Park, "A 4PAM/2PAM coaxial cable receiver analog front-end targeting 40 Gb/s in 90-nm CMOS", A Thesis submitted in conformity with the requirements for the degree of Master of Applied Science Graduate Department of Electrical and Computer Engineering University of Toronto, (search was conducted on Jul. 28, 2015), <URL: tspace.library.utoronto.ca/bitstream/1807/11160/1/Park_Peter_200806_MASc_thesis.pdf>

Optical Internetworking Forum (OIF), "Evolution of System Electrical Interfaces Towards 400G Transport", (search was conducted on Jul. 28, 2015), <URL: www.oiforum.com/public/documents/30921b_Combined_Mkt_Focus_ECOC_Panel_OIF.pdf>

By the way, in recent years standards for data communication using four-level pulse amplitude modulation (PAM) in place of a two-level modulation transmission system, such as non return to zero (NRZ), have been created in order to realize data communication at higher data rates.

If four or more level modulation is used, the number of ISIs which may occur is large compared with the case of NRZ. As a result, the number of comparator circuits used in a speculative DFE is significantly large compared with the case of NRZ. This leads to an increase in the power consumption of comparator circuits and an increase in the power consumption of circuits which drive the comparator circuits.

SUMMARY

According to an aspect, there is provided a decision feedback equalizer including a plurality of comparator circuits which output comparison results of comparisons between a pulse amplitude modulated input signal with four or more values and a plurality of first thresholds, a selection section which decides a value of the input signal at first timing by selecting one of the comparison results outputted from the plurality of comparator circuits on the basis of a decision result of a value of the input signal at second timing before the first timing, and a threshold setting section which generates the plurality of first thresholds from a plurality of third thresholds obtained by adding an offset value based on magnitude of inter-symbol interference corresponding to each of the values to one of second thresholds whose number is based on a number of values, based on a first average value of third thresholds greater than a second threshold or a second average value of third thresholds smaller than the second threshold and an adjustment value based on the decision result and which sets the plurality of first thresholds in the plurality of comparator circuits.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 indicates the relationship between an input and an output of the DFE at the time of n=2;

FIG. 12 indicates an example of the relationship between an input and an output of the DFE at the time of n=3;

DESCRIPTION OF EMBODIMENTS

Figure 1:
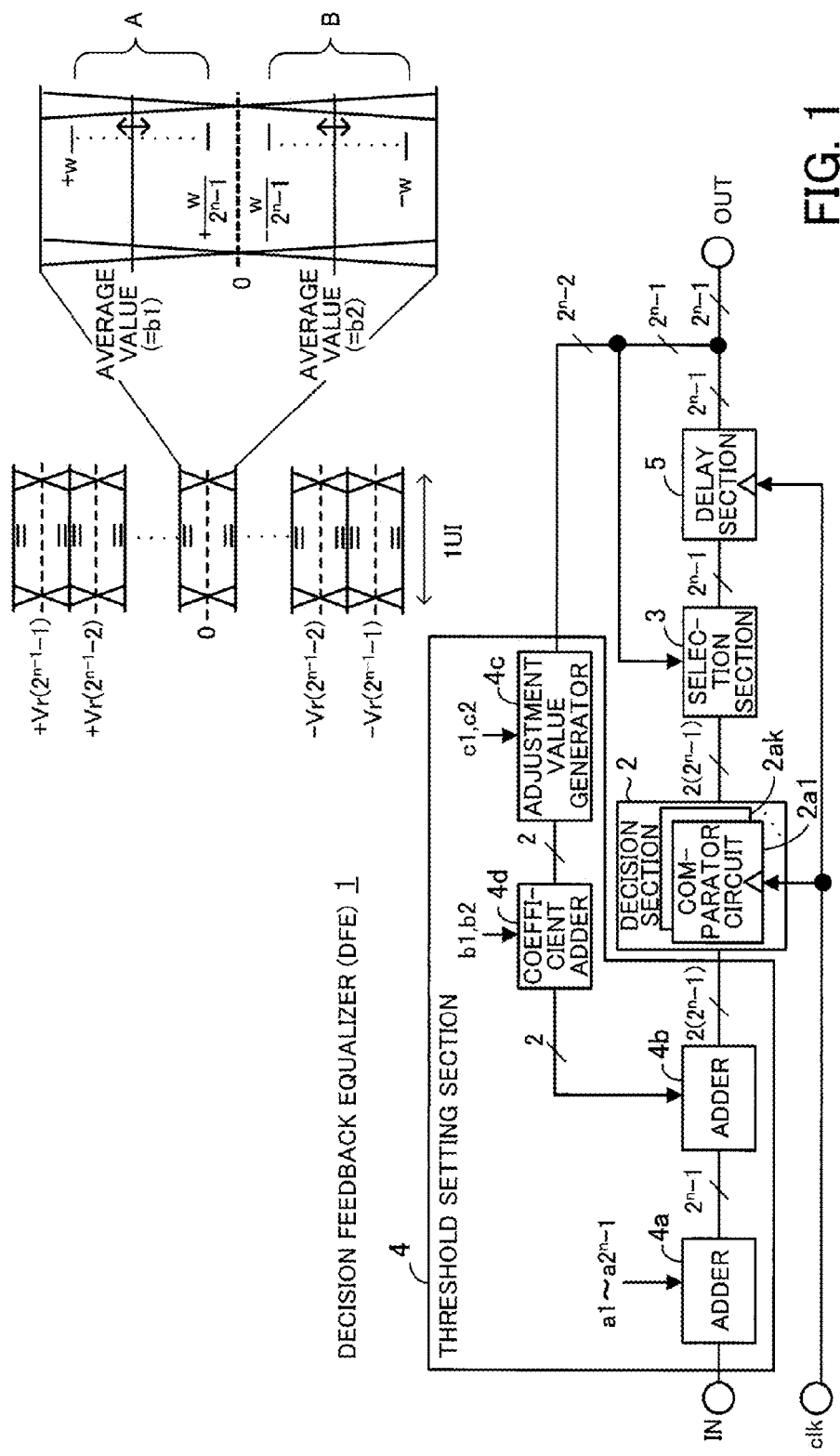
FIG. 1 illustrates an example of a decision feedback equalizer (DFE) according to a first embodiment.

Embodiments will now be described with reference to the accompanying drawings, wherein like reference numerals refer to like elements throughout.

First Embodiment

FIG. 1 illustrates an example of a decision feedback equalizer (DFE) according to a first embodiment.

In order to simplify description, it is assumed that a DFE is a full-rate DEF and that the tap number is one (post-cursor ISIs other than a first post-cursor ISI are neglected). Furthermore, it is assumed that an input signal (data signal) IN is a $2^n$-level (n≥2) PAM signal and that its values are 0 to $2^n-1$.

A DFE 1 includes a decision section 2, a selection section 3, a threshold setting section 4, and a delay section 5.

The decision section 2 includes a plurality of comparator circuits $2a1$ through $2ak$ which output comparison results (digital signals) of comparisons between the four or more level PAM input signal IN and a plurality of first thresholds (hereinafter referred to as decision thresholds) set by the threshold setting section 4. That is to say, the decision section 2 has the function of converting the input signal IN, which is an analog signal, to digital signals. The number of the comparator circuits $2a1$ through $2ak$ is $2(2^n-1)$ for a reason described later. With the DFE 1 according to the first embodiment the comparator circuits $2a1$ through $2ak$ compare at timing based on a clock signal clk 0 and the input signals IN to which the decision thresholds have been added. By doing so, the comparator circuits $2a1$ through $2ak$ equivalently output comparison results of comparisons between the input signal IN and the decision thresholds.

The selection section 3 selects at certain timing one of comparison results outputted from the comparator circuits $2a1$ through $2ak$ on the basis of a decision result of a value of the input signal IN at timing before the certain timing. By doing so, the selection section 3 decides a value of the input signal IN. That is to say, the selection section 3 decides a value of the input signal IN on the basis of a past decision result.

The threshold setting section 4 selectively generates the above decision thresholds from a plurality of third thresholds obtained by adding offset values based on the magnitude of ISIs corresponding to the values of the input signal IN to second thresholds whose number is based on the number of the values of the input signal IN. FIG. 1 illustrates the relationship between an eye pattern of the input signal IN for one UI and the second thresholds (voltage). $-Vr(2^{n-1}-1)$, $-Vr(2^{n-1}-2)$, . . . , 0, . . . , $+Vr(2^{n-1}-2)$, and $+Vr(2^{n-1}-1)$ are the second thresholds. The number of the second thresholds is $2^n-1$ to decide the $2^n$ values. Furthermore, $-w$, . . . , $-w/(2^n-1)$, $+w/(2^n-1)$, . . . , and $+w$ which are the third thresholds are indicated in FIG. 1. These third thresholds are obtained by adding offset values based on the magnitude of ISIs corresponding to the $2^n$ values to 0 which is one of the second thresholds. For example, when a value of the input signal makes the transition from "0", through "$2^n-1$", to "0", w is the magnitude of an ISI (first post-cursor ISI) caused by "$2^n-1$" indicated one UI before a UI for which a value of the input signal is the last "0" (see FIG. 4).

The threshold setting section 4 generates the decision thresholds from the above third thresholds on the basis of the average value of third thresholds which are greater than a second threshold or the average value of third thresholds which are smaller than the second threshold, a past decision result, and an adjustment value.

For example, when a decision result obtained one UI before is $2^n$, the threshold setting section 4 generates +w as a decision threshold by adding an adjustment value to the average value (corresponding to a coefficient b1 described later) of third thresholds which are greater than the second threshold "0". In addition, when a decision result obtained one UI before is 0, the threshold setting section 4 generates −w as a decision threshold by subtracting an adjustment value from the average value (corresponding to a coefficient b2 described later) of third thresholds which are smaller than the second threshold "0".

In order to make an adjustment on the basis of the above average value, the coefficient b1 or b2 to be added to a second threshold is set in advance. The coefficient b1 is $2^n \cdot w/(2^n-1)$ and the coefficient b2 is $-2^{n-1} \cdot w/(2^n-1)$. Furthermore, in order to generate −w to +w from an average value, the minimum value of an adjustment value is half of the resolution of the third thresholds, that is to say, $w/(2^n-1)$.

In addition, the threshold setting section 4 sets the decision thresholds it generates in the comparator circuits $2a1$ through $2ak$. Decision thresholds selected from third thresholds greater than a second threshold (decision thresholds generated in a range A in FIG. 1) and decision thresholds selected from third thresholds smaller than the second threshold (decision thresholds generated in a range B in FIG. 1) are set in separate comparator circuits.

As illustrated in FIG. 1, the threshold setting section 4 which sets decision thresholds in the above way includes, for example, adders $4a$ and $4b$, an adjustment value generator $4c$, and a coefficient adder $4d$.

The adder $4a$ adds coefficients a1 through a$2^n$–1 to the input signal IN. The coefficients a1 to a$2^n$–1 are the above second thresholds —Vr($2^{n-1}$–1) to +Vr($2^{n-1}$–2). As a result, the number of outputs of the adder $4a$ is $2^n$–1.

The adder $4b$ adds two outputs of the coefficient adder $4d$ to each of the outputs of the adder $4a$. As a result, the adder $4b$ outputs $2(2^n-1)$ decision thresholds.

The adjustment value generator $4c$ generates two adjustment values on the basis of a past decision result and coefficients c1 and c2. The coefficients c1 and c2 are the minimum value of an adjustment value (half of the resolution of the third thresholds) described above, that is to say, $w/(2^n-1)$.

The coefficient adder $4d$ adds the coefficient b1 to one of two adjustment values generated by the adjustment value generator $4c$ and adds the coefficient b2 to the other of the two adjustment values generated by the adjustment value generator $4c$.

For example, the coefficients a1 to a$2^n$–1, b1, b2, c1, and c2 are supplied from a control section (processor) not illustrated or are stored in advance in a storage section such as a register.

A circuit for the threshold setting section 4 is not limited to that illustrated in FIG. 1. Another example will be described later.

In order to feed back an output of the selection section 3 (decision result of the input signal IN) at proper timing to the selection section 3 and the threshold setting section 4, the delay section 5 outputs a decision result of the input signal IN every UI at timing based on the clock signal clk. An output of the delay section 5 is an output signal OUT of the DFE 1. The delay section 5 may not be included.

An example of the operation of the DFE 1 will now be described briefly.

When the input signal IN is inputted to the DFE 1, the threshold setting section 4 generates $2(2^n-1)$ decision thresholds from $2^n(2^n-1)$ third thresholds on the basis of the coefficients b1 and b2 and an adjustment value based on a past decision result, adds the decision thresholds to the input signal IN, and supplies the input signals IN to which the decision thresholds have been added to the decision section 2. By doing so, different decision thresholds are set in the $2(2^n-1)$ comparator circuits $2a1$ through $2ak$.

The comparator circuits $2a1$ through $2ak$ output the results of comparisons between the input signals IN to which the decision thresholds have been added and 0. For example, when the input signals IN to which the decision thresholds have been added are greater than or equal to 0, the comparator circuits $2a1$ through $2ak$ output "1". When the input signals IN to which the decision thresholds have been added are smaller than 0, the comparator circuits $2a1$ through $2ak$ output "–1".

On the basis of a past decision result of the input signal IN delayed by the delay section 5, the selection section 3 selects one of the comparison results outputted from the comparator circuits $2a1$ through $2ak$, and outputs it as a decision result of a value of the input signal IN. For example, when a past decision result is greater than or equal to $2^{n-1}$, the selection section 3 selects an output of a comparator circuit which makes a comparison on the basis of a decision threshold generated in the range A in FIG. 1. When a past decision result is smaller than $2^{n-1}$, the selection section 3 selects an output of a comparator circuit which makes a comparison on the basis of a decision threshold generated in the range B in FIG. 1. In this case, the selection section 3 uses as a control signal one signal, of $(2^n-1)$ signals indicative of past decision results, which indicates that a decision result is greater than or equal to or smaller than $2^{n-1}$. The other $(2^n-2)$ signals are used by the threshold setting section 4 for generating decision thresholds.

$(2^n-1)$ signals which are outputted from the selection section 3 and which indicates decision results of the input signal IN are delayed by the delay section 5 and are outputted as the output signal OUT.

The above DFE 1 selectively generates decision thresholds to be used from the $2^n(2^n-1)$ third thresholds based on the number of the values and the magnitude of the ISIs on the basis of the above average values and an adjustment value based on a past decision result. This reduces the number of the comparator circuits $2a1$ through $2ak$ from $2^n(2^n-1)$ to $2(2^n-1)$. As a result, an increase in the power consumption of the comparator circuits $2a1$ through $2ak$ caused by an increase in the value of n is checked and an increase in the power consumption of circuits used for driving the comparator circuits $2a1$ through $2ak$ is checked. That is to say, an increase in the power consumption of the DFE 1 and an increase in the power consumption of an apparatus including the DFE 1 are checked.

An example of a DFE at the time of n=2, that is to say, a DFE which decides a value of a four-level PAM (PAM4) input signal will now be described.

Figure 2:
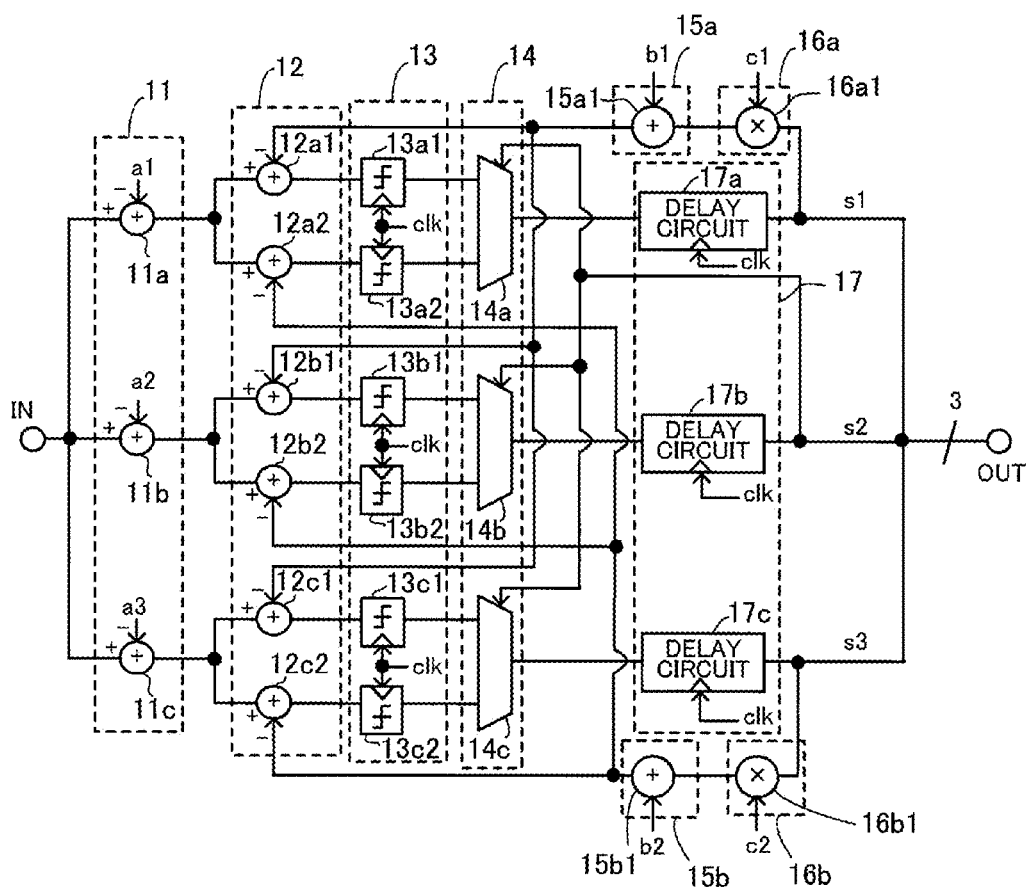
FIG. 2 illustrates an example of the DFE according to the first embodiment at the time of n=2.

FIG. 2 illustrates an example of the DFE according to the first embodiment at the time of n=2.

A DFE 10 includes addition sections 11 and 12, a decision section 13, a selection section 14, coefficient addition sections $15a$ and $15b$, adjustment value generation sections $16a$ and $16b$, and a delay section 17.

The addition sections 11 and 12 correspond to the adders $4a$ and $4b$ illustrated in FIG. 1. The decision section 13 and the selection section 14 correspond to the decision section 2 and the selection section 3, respectively, illustrated in FIG. 1. The coefficient addition sections $15a$ and $15b$ correspond to the coefficient adder $4d$ illustrated in FIG. 1. The adjustment value generation sections $16a$ and $16b$ correspond to the adjustment value generator $4c$ illustrated in FIG. 1. The delay section 17 corresponds to the delay section 5 illustrated in FIG. 1.

The addition section 11 adds coefficients a1 through a3 to an input signal IN. The coefficients a1 through a3 are +Vr, 0, and –Vr, respectively, which are the above second thresholds. The addition section 11 includes adders $11a$, $11b$, and $11c$. The adder $11a$ subtracts the coefficient a1 from an input signal IN. The adder $11b$ subtracts the coefficient a2 from the input signal IN. The adder $11c$ subtracts the coefficient a3 from the input signal IN.

The addition section 12 adds two outputs of the coefficient addition sections $15a$ and $15b$ to each output of the addition section 11. By doing so, the addition section 12 outputs signals obtained by adding six decision thresholds to the input signal IN. The addition section 12 includes adders $12a1$, $12a2$, $12b1$, $12b2$, $12c1$, and $12c2$.

The adder $12a1$ subtracts an output of the coefficient addition section $15a$ from an output of the adder $11a$. The adder $12a2$ subtracts an output of the coefficient addition section $15b$ from the output of the adder $11a$. The adder $12b1$ subtracts the output of the coefficient addition section $15a$ from an output of the adder $11b$. The adder $12b2$ subtracts the output of the coefficient addition section $15b$ from the output of the adder $11b$. The adder $12c1$ subtracts the output of the coefficient addition section $15a$ from an output of the adder 11c. The adder 12c2 subtracts the output of the coefficient addition section 15b from the output of the adder 11c.

The decision section 13 decides whether or not the input signal IN is greater than or equal to a decision threshold. The decision section 13 includes comparator circuits 13a1, 13a2, 13b1, 13b2, 13c1, and 13c2. The comparator circuits 13a1 through 13c2 output the results of comparison between output signals of the adders 12a1 through 12c2, respectively, and 0 at timing based on a clock signal clk. For example, if the output signals of the adders 12a1 through 12c2 are greater than or equal to 0, then the comparator circuits 13a1 through 13c2 output "1". If the output signals of the adders 12a1 through 12c2 are smaller than 0, then the comparator circuits 13a1 through 13c2 output "−1".

The selection section 14 includes selection circuits 14a, 14b, and 14c. Of three signals s1, s2, and s3 indicative of decision results of the input signal IN, the selection circuits 14a, 14b, and 14c input the signal s2 as a control signal. On the basis of a value of the signal s2, the selection circuits 14a, 14b, and 14c then select one of comparison results outputted from the comparator circuits 13a1 through 13c2 respectively. When the signal s2 is 1, the selection circuit 14a selects an output of the comparator circuit 13a1, the selection circuit 14b selects an output of the comparator circuit 13b1, and the selection circuit 14c selects an output of the comparator circuit 13c1. When the signal s2 is −1, the selection circuit 14a selects an output of the comparator circuit 13a2, the selection circuit 14b selects an output of the comparator circuit 13b2, and the selection circuit 14c selects an output of the comparator circuit 13c2.

The coefficient addition section 15a includes an adder 15a1. The adder 15a1 adds a coefficient b1 to an adjustment value generated by the adjustment value generation section 16a, and outputs a value obtained. The coefficient addition section 15b includes an adder 15b1. The adder 15b1 adds a coefficient b2 to an adjustment value generated by the adjustment value generation section 16b, and outputs a value obtained.

The adjustment value generation section 16a includes a multiplier 16a1. The multiplier 16a1 generates an adjustment value by multiplying the signal s1, of the signals s1, s2, and s3, by a coefficient c1. The adjustment value generation section 16b includes a multiplier 16b1. The multiplier 16b1 generates an adjustment value by multiplying the signal s3, of the signals s1, s2, and s3, by a coefficient c2.

The delay section 17 includes delay circuits 17a, 17b, and 17c. The delay circuits 17a, 17b, and 17c are, for example, D flip-flops. The delay circuit 17a receives a value (1 or −1) outputted from the selection circuit 14a, and outputs it as the signal s1 at timing based on the clock signal clk. The delay circuit 17b receives a value outputted from the selection circuit 14b, and outputs it as the signal s2 at timing based on the clock signal clk. The delay circuit 17c receives a value outputted from the selection circuit 14c, and outputs it as the signal s3 at timing based on the clock signal clk.

An example of the operation of the DFE 10 will now be described.

It is assumed that the relationship between the input signal IN and an output signal OUT (signals s1 through s3) is as follows.

Figure 3:
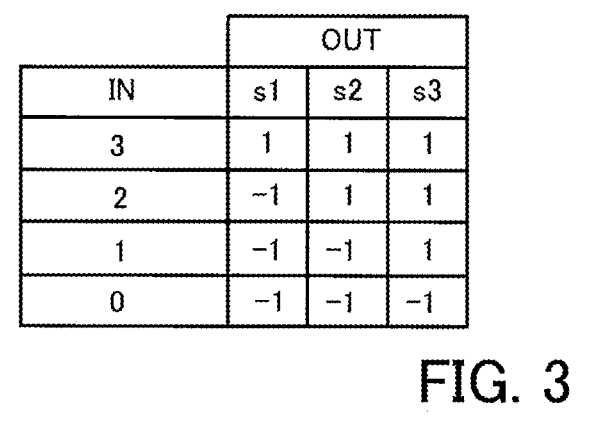

FIG. 3 indicates the relationship between an input and an output of the DFE at the time of n=2.

When the input signal IN indicates 3, all of the signals s1 through s3 are 1. When the input signal IN indicates 2, the signal s1 is −1 and the signals s2 and s3 are 1. When the input signal IN indicates 1, the signals s1 and s2 are −1 and the signal s3 is 1. When the input signal IN indicates 0, all of the signals s1 through s3 are −1.

Because the DFE 10 decides a value of the four-level PAM input signal IN, the number of second thresholds described above is three. Furthermore, an offset value based on the magnitude of an ISI corresponding to each of the four values is added to each second threshold. As a result, the number of third thresholds used as decision thresholds is twelve.

Figure 4:
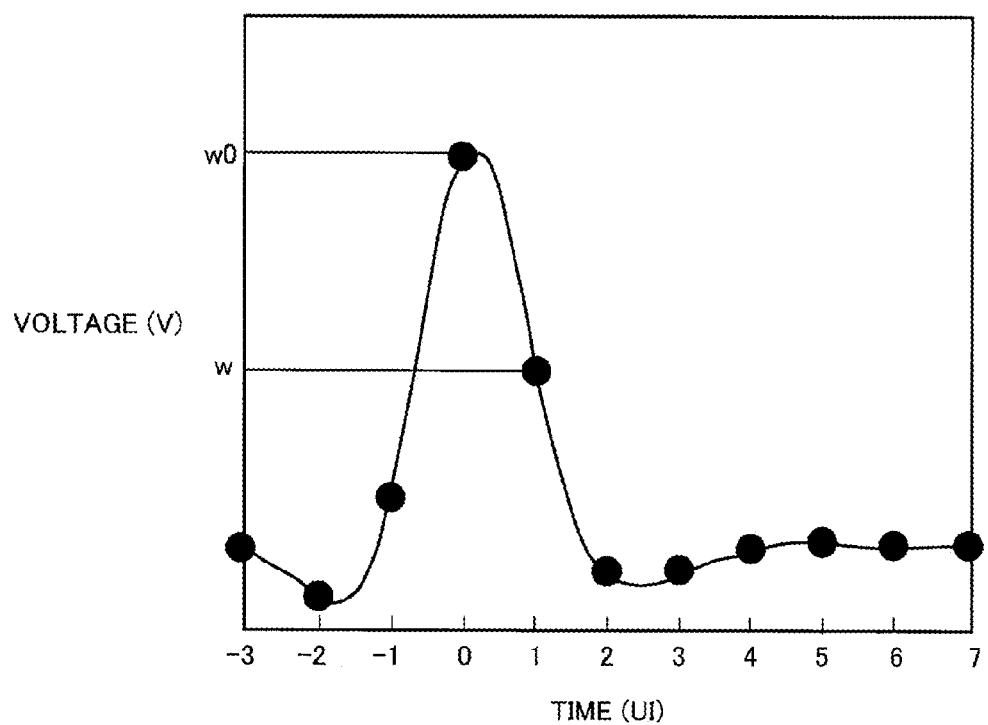
FIG. 4 indicates an example of an ISI.

FIG. 4 indicates an example of an ISI.

In FIG. 4, a horizontal axis indicates time (UI) and a vertical axis indicates voltage (V).

FIG. 4 indicates an example of an ISI which occurs when the value of the input signal IN makes the transition from "0", through "3", to "0". The magnitude (voltage) of an ISI (first post-cursor ISI) caused by the value "3" (voltage=w0 (V)) indicated one UI before a UI during which the input signal IN indicates the second "0" is "w (V)".

As stated above, when the value of the input signal IN for a UI is decided, it is assumed that if a value of the input signal IN is "3" one UI before, the magnitude of an ISI is "w", that if a value of the input signal IN is "2" one UI before, the magnitude of an ISI is "w/3", that if a value of the input signal IN is "1" one UI before, the magnitude of an ISI is "−w/3", and that if a value of the input signal IN is "0" one UI before, the magnitude of an ISI is "−w". Then the third thresholds are as follows.

Figure 5:
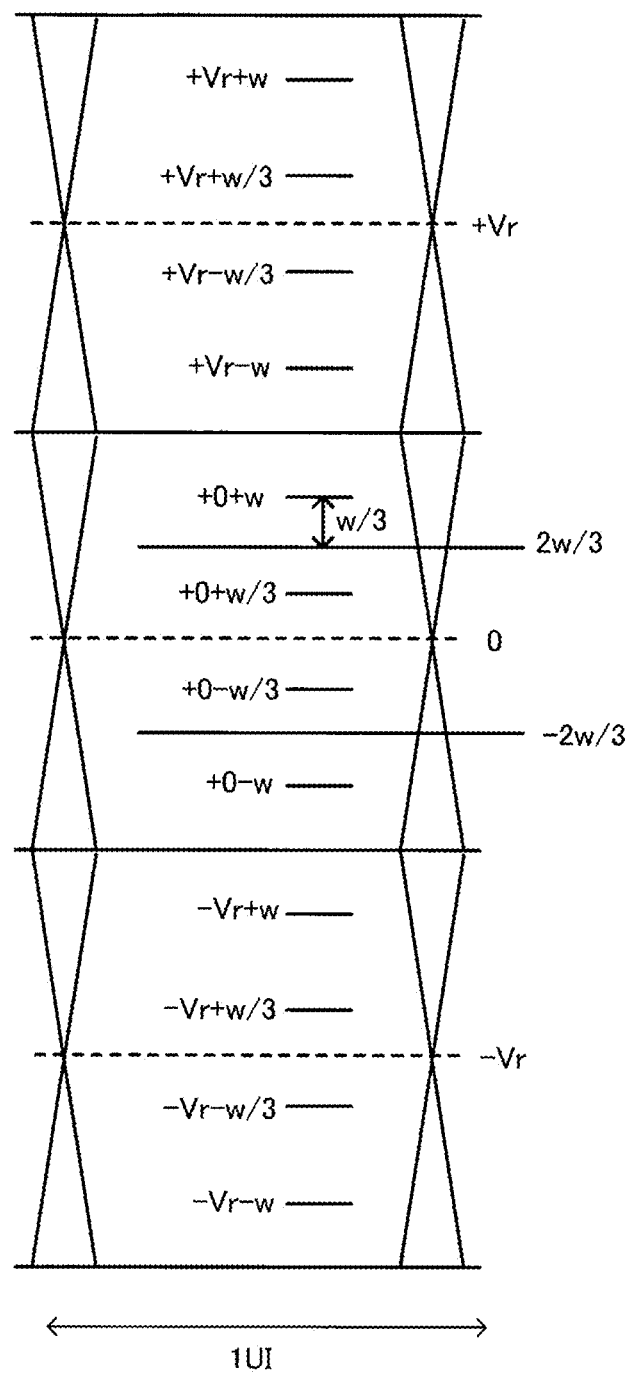
FIG. 5 indicates an example of the relationship at the time of n=2 between an eye pattern of an input signal IN for one UI and second and third thresholds.

FIG. 5 indicates an example of the relationship at the time of n=2 between an eye pattern of the input signal IN for one UI and the second and third thresholds.

In the example of FIG. 5, the second thresholds are −Vr, 0, and +Vr. The third thresholds are obtained by adding offset values based on the magnitude of the above four ISIs to the second thresholds. That is to say, as indicated in FIG. 5, the third thresholds are −Vr−W to +Vr+w and the number of the third thresholds is twelve. Furthermore, in FIG. 5, the average value 2w/3 of +0+w and +0+w/3, of the third thresholds obtained by adding the four offset values to the second threshold "0", which are greater than 0 and the average value −2w/3 of +0−w/3 and +0−w, of the third thresholds obtained by adding the four offset values to the second threshold "0", which are smaller than 0 are indicated. The difference between the average values and the third thresholds nearest them is w/3.

With the DFE 10 decision thresholds set in the comparator circuits 13a1 through 13c2 are selectively generated in the following way from the above twelve third thresholds on the basis of a past decision result, the average value of third thresholds greater than each second threshold or the average value of third thresholds smaller than each second threshold, and an adjustment value in order to properly curb the influence of an ISI.

Figure 6:
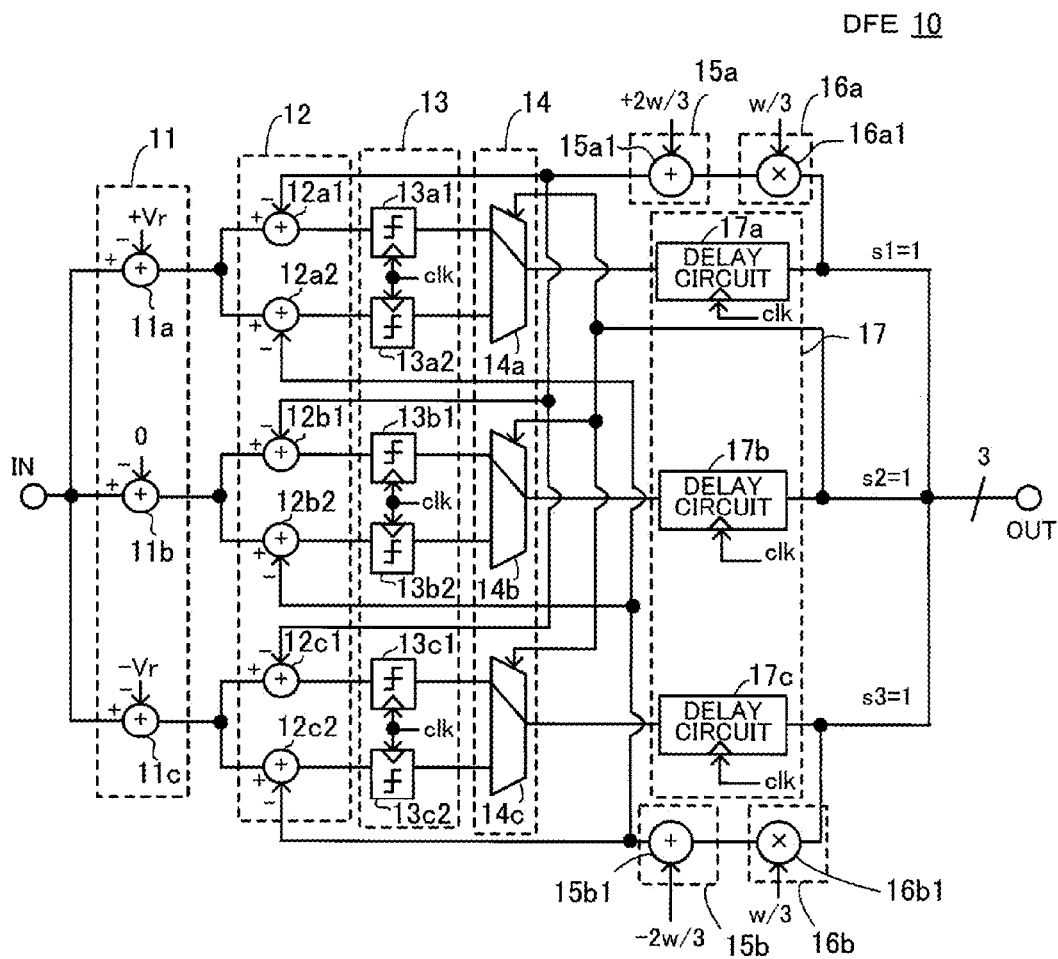
FIG. 6 illustrates an example of the operation of the DFE at the time of a value indicated one UI before being "3"

FIG. 6 illustrates an example of the operation of the DFE at the time of a value indicated one UI before being "3".

In FIG. 6, the second thresholds +Vr, 0, and −Vr are set as the coefficients a1 through a3 indicated in FIG. 2. Furthermore, +2w/3 and −2w/3 are set as the coefficients b1 and b2, respectively, and w/3 is set as the coefficients c1 and c2.

When a value indicated one UI before is "3" and the decision section 13 makes a decision, all of the signals s1 through s3 outputted from the delay circuits 17a through 17c, respectively, are "1". Because s2=1, the selection circuits 14a through 14c select outputs of the comparator circuits 13a1, 13b1, and 13c1 respectively. Furthermore, because s1=1, an output of the adder 15a1 is "w". Accordingly, decision thresholds of the comparator circuits 13a1, 13*b*1, and 13*c*1 are set to "+Vr+w", "+0+w", and "−Vr+w", respectively, of the third thresholds indicated in FIG. 5.

As a result, the DFE 10 outputs decision results of the comparator circuits 13*a*1, 13*b*1, and 13*c*1 in which proper decision thresholds are set for the value "3" indicated one UI before because these decision thresholds are obtained by adding offset voltage (=w) based on the magnitude of an ISI (first post-cursor ISI) caused by the value "3" indicated one UI before to the second thresholds.

Figure 7:
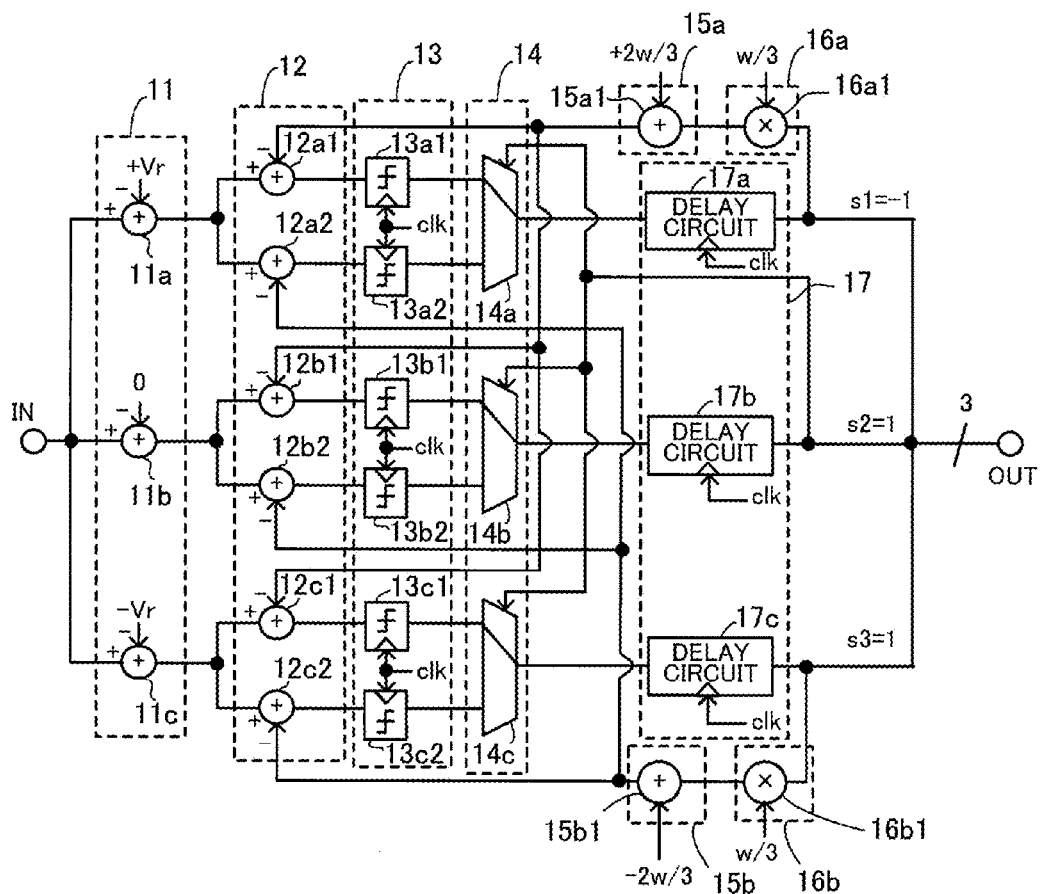
FIG. 7 illustrates an example of the operation of the DFE at the time of a value indicated one UI before being "2"

FIG. 7 illustrates an example of the operation of the DFE at the time of a value indicated one UI before being "2".

The values of coefficients a1 through a3, b1, b2, c1, and c2 are the same as those of the coefficients a1 through a3, b1, b2, c1, and c2, respectively, in FIG. 6.

When a value indicated one UI before is "2" and the decision section 13 makes a decision, the signals s1 through s3 outputted from the delay circuits 17*a* through 17*c* are "−1," "1," and "1" respectively. Because s2=1, the selection circuits 14*a* through 14*c* select outputs of the comparator circuits 13*a*1, 13*b*1, and 13*c*1 respectively. Furthermore, because s1=−1, an output of the adder 15*a*1 is "w/3". Accordingly, decision thresholds of the comparator circuits 13*a*1, 13*b*1, and 13*c*1 are set to "+Vr+w/3", "+0+w/3", and "−Vr+w/3", respectively, of the third thresholds indicated in FIG. 5.

As a result, the DFE 10 outputs decision results of the comparator circuits 13*a*1, 13*b*1, and 13*c*1 in which proper decision thresholds are set for the value "2" indicated one UI before because these decision thresholds are obtained by adding offset voltage (=w/3) based on the magnitude of an ISI (first post-cursor ISI) caused by the value "2" indicated one UI before to the second thresholds.

Figure 8:
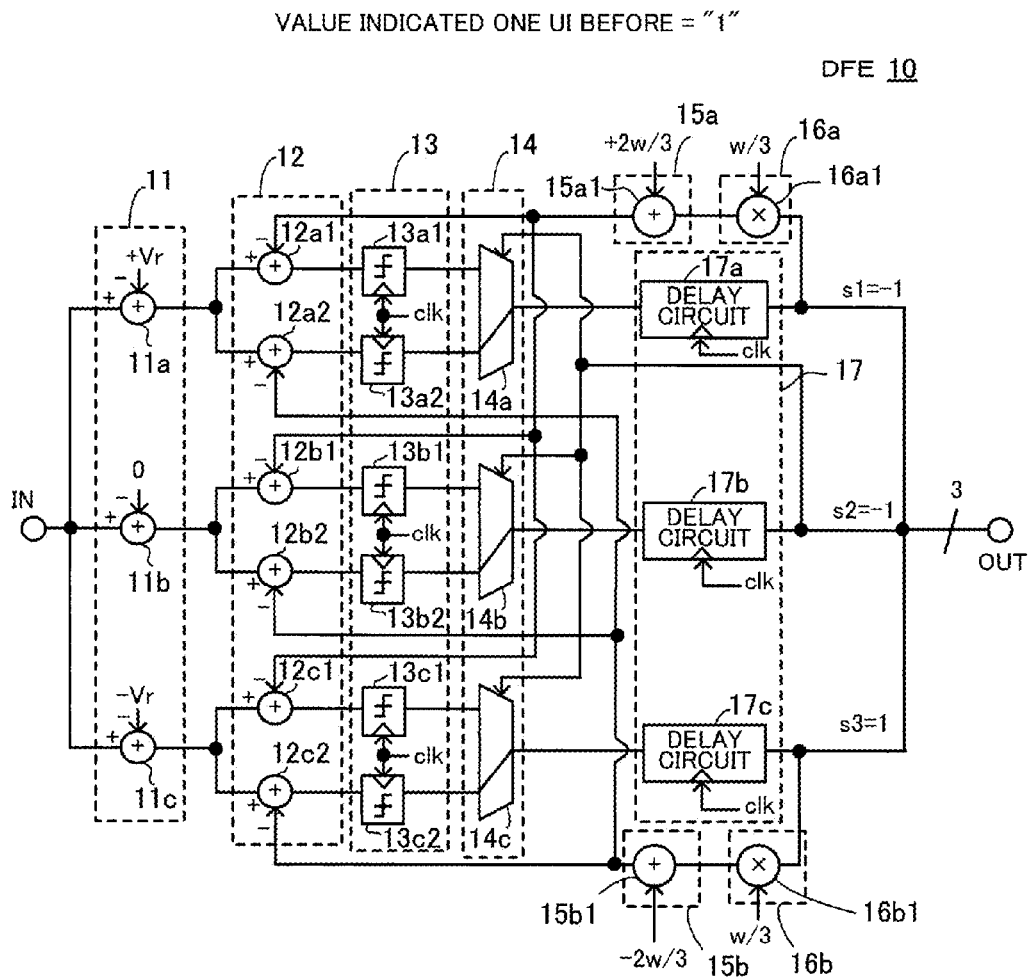
FIG. 8 illustrates an example of the operation of the DFE at the time of a value indicated one UI before being "1"

FIG. 8 illustrates an example of the operation of the DFE at the time of a value indicated one UI before being "1".

The values of coefficients a1 through a3, b1, b2, c1, and c2 are the same as those of the coefficients a1 through a3, b1, b2, c1, and c2, respectively, in FIG. 6.

When a value indicated one UI before is "1" and the decision section 13 makes a decision, the signals s1 through s3 outputted from the delay circuits 17*a* through 17*c* are "−1," "−1," and "1" respectively. Because s2=−1, the selection circuits 14*a* through 14*c* select outputs of the comparator circuits 13*a*2, 13*b*2, and 13*c*2 respectively. Furthermore, because s3=1, an output of the adder 15*b*1 is "−w/3". Accordingly, decision thresholds of the comparator circuits 13*a*2, 13*b*2, and 13*c*2 are set to "+Vr−w/3", "+0−w/3", and "−Vr−w/3", respectively, of the third thresholds indicated in FIG. 5.

As a result, the DFE 10 outputs decision results of the comparator circuits 13*a*2, 13*b*2, and 13*c*2 in which proper decision thresholds are set for the value indicated one UI before because these decision thresholds are obtained by adding offset voltage (=−w/3) based on the magnitude of an ISI (first post-cursor ISI) caused by the value "1" indicated one UI before to the second thresholds.

Figure 9:
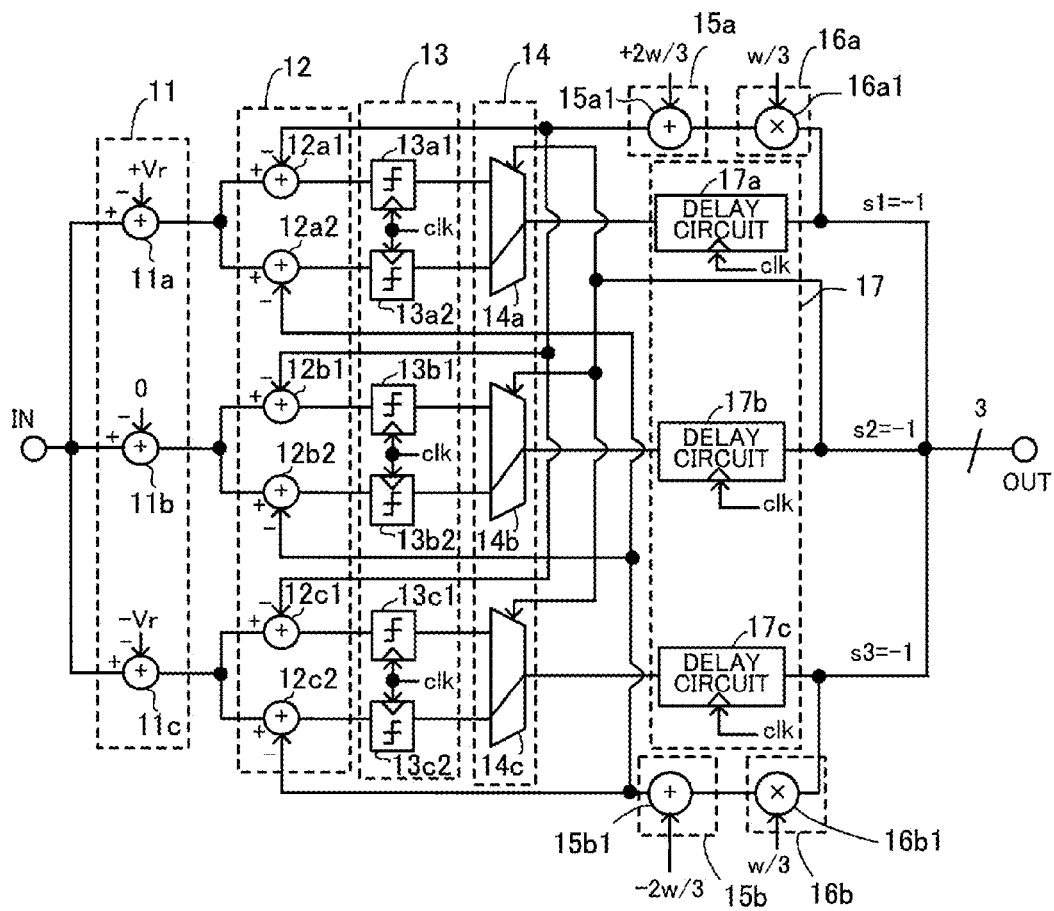
FIG. 9 illustrates an example of the operation of the DFE at the time of a value indicated one UI before being "0"

FIG. 9 illustrates an example of the operation of the DFE at the time of a value indicated one UI before being "0".

The values of coefficients a1 through a3, b1, b2, c1, and c2 are the same as those of the coefficients a1 through a3, b1, b2, c1, and c2 respectively, in FIG. 6.

When a value indicated one UI before is "0" and the decision section 13 makes a decision, all of the signals s1 through s3 outputted from the delay circuits 17*a* through 17*c*, respectively, are "−1". Because s2=−1, the selection circuits 14*a* through 14*c* select outputs of the comparator circuits 13*a*2, 13*b*2, and 13*c*2 respectively. Furthermore, because s3=−1, an output of the adder 15*b*1 is "−w".

Accordingly, decision thresholds of the comparator circuits 13*a*2, 13*b*2, and 13*c*2 are set to "+Vr−w", "+0−w", and "−Vr−w", respectively, of the third thresholds indicated in FIG. 5.

As a result, the DFE 10 outputs decision results of the comparator circuits 13*a*2, 13*b*2, and 13*c*2 in which proper decision thresholds are set for the value "0" indicated one UI before because these decision thresholds are obtained by adding offset voltage (=−w) based on the magnitude of an ISI (first post-cursor ISI) caused by the value "0" indicated one UI before to the second thresholds.

An example of a DFE at the time of n=3, that is to say, a DFE which decides a value of an eight-level PAM input signal will now be described.

Figure 10:
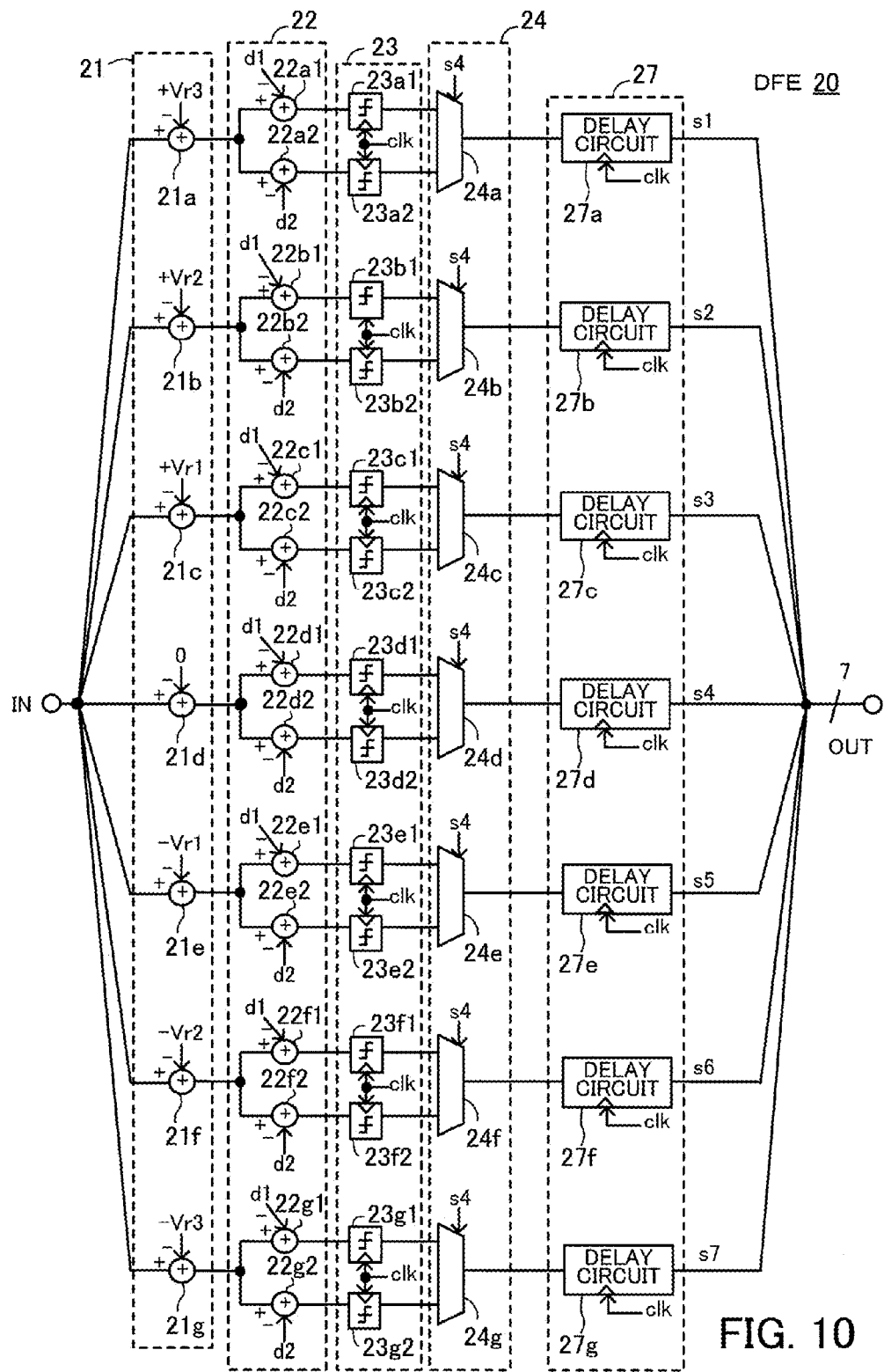
FIG. 10 illustrates an example of the DFE according to the first embodiment at the time of n=3 (part 1)
Figure 11:
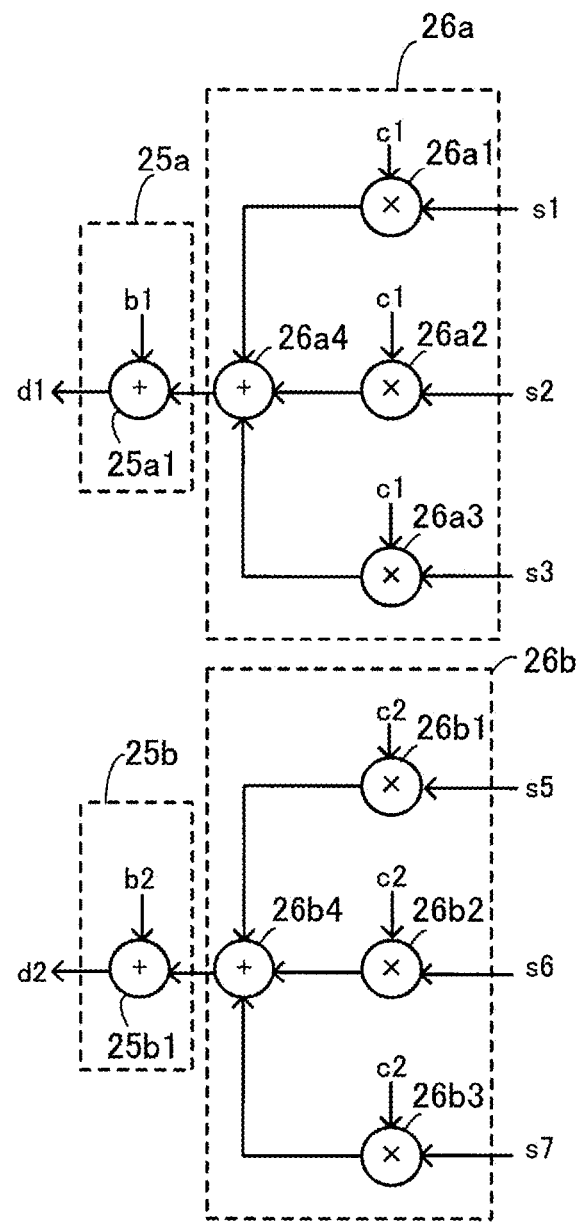
FIG. 11 illustrates an example of the DFE according to the first embodiment at the time of n=3 (part 2)

FIGS. 10 and 11 illustrate an example of the DFE according to the first embodiment at the time of n=3.

A DFE 20 includes addition sections 21 and 22, a decision section 23, a selection section 24, coefficient addition sections 25*a* and 25*b*, adjustment value generation sections 26*a* and 26*b*, and a delay section 27.

The functions of the addition sections 21 and 22, the decision section 23, the selection section 24, and the delay section 27 are the same as those of the addition sections 11 and 12, the decision section 13, the selection section 14, and the delay section 17, respectively, included in the DFE 10 illustrated in FIG. 2. However, because an input signal is an eight-level PAM input signal, the number of circuit elements increases.

The addition section 21 adds +Vr3, +Vr2, +Vr1, 0, −Vr1, −Vr2, and −Vr3, which are the above second thresholds, to an input signal IN. The addition section 21 includes adders 21*a*, 21*b*, 21*c*, 21*d*, 21*e*, 21*f*, and 21*g*.

The adder 21*a* subtracts +Vr3 from the input signal IN. The adder 21*b* subtracts +Vr2 from the input signal IN. The adder 21*c* subtracts +Vr1 from the input signal IN. The adder 21*d* subtracts 0 from the input signal IN. The adder 21*e* subtracts −Vr1 from the input signal IN. The adder 21*f* subtracts −Vr2 from the input signal IN. The adder 21*g* subtracts −Vr3 from the input signal IN.

The addition section 22 adds two output signals d1 and d2 outputted from the coefficient addition sections 25*a* and 25*b*, respectively, to each output of the addition section 21. By doing so, the addition section 22 outputs signals obtained by adding fourteen decision thresholds to the input signal IN. The addition section 22 includes adders 22*a*1, 22*a*2, 22*b*1, 22*b*2, 22*c*1, 22*c*2, 22*d*1, 22*d*2, 22*e*1, 22*e*2, 22*f*1, 22*f*2, 22*g*1, and 22*g*2. The operation of the adders 22*a*1 through 22*g*2 is the same as that of the adders 12*a*1 through 12*c*2 included in the DFE 10 illustrated in FIG. 2. Accordingly, its description will be omitted.

The decision section 23 decides whether or not the input signal IN is greater than or equal to a decision threshold. The decision section 23 includes comparator circuits 23*a*1, 23*a*2, 23*b*1, 23*b*2, 23*c*1, 23*c*2, 23*d*1, 23*d*2, 23*e*1, 23*e*2, 23*f*1, 23*f*2, 23*g*1, and 23*g*2. The comparator circuits 23*a*1 through 23*g*2 output the results of comparison between output signals of the adders 22*a*1 through 22*g*2, respectively, and 0 at timing based on a clock signal clk. For example, if the output signals of the adders 22*a*1 through 22*g*2 are greater than or equal to 0, then the comparator circuits 23*a*1 through 23*g*2 output "1". If the output signals of the adders 22*a*1 through 22*g*2 are smaller than 0, then the comparator circuits 23*a*1 through 23*g*2 output "−1".

The selection section 24 includes selection circuits 24*a*, 24*b*, 24*c*, 24*d*, 24*e*, 24*f*, and 24*g*. Of seven signals s1, s2, s3, s4, s5, s6, and s7 indicative of past decision results of the input signal IN, the selection circuits 24*a* through 24*g* input the signal s4 as a control signal. On the basis of a value of the signal s4, the selection circuits 24a through 24g then select one of comparison results outputted from the comparator circuits 23a1 through 23g2 respectively.

When s4=1, the selection circuits 24a through 24g select outputs of the comparator circuits 23a1, 23b1, 23c1, 23d1, 23e1, 23f1, and 23g1 respectively. When s4=−1, the selection circuits 24a through 24g select outputs of the comparator circuits 23a2, 23b2, 23c2, 23d2, 23e2, 23f2, and 23g2 respectively.

As illustrated in FIG. 11, the coefficient addition section 25a includes an adder 25a1. The adder 25a1 adds a coefficient b1 to an adjustment value generated by the adjustment value generation section 26a, and outputs an obtained value as the output signal d1. The coefficient addition section 25b includes an adder 25b1. The adder 25b1 adds a coefficient b2 to an adjustment value generated by the adjustment value generation section 26b, and outputs an obtained value as the output signal d2.

The adjustment value generation section 26a includes multipliers 26a1, 26a2, and 26a3 and an adder 26a4. The multipliers 26a1 through 26a3 multiply the signals s1 through s3, respectively, of the signals s1 through s7 by a coefficient c1. The adder 26a4 adds up multiplication results of the multipliers 26a1 through 26a3 to generate an adjustment value. The adjustment value generation section 26b includes multipliers 26b1, 26b2, and 26b3 and an adder 26b4. The multipliers 26b1 through 26a3 multiply the signals s5 through s7, respectively, of the signals s1 through s7 by a coefficient c2. The adder 26b4 adds up multiplication results of the multipliers 26b1 through 26b3 to generate an adjustment value.

As illustrated in FIG. 10, the delay section 27 includes delay circuits 27a, 27b, 27c, 27d, 27e, 27f, and 27g. The delay circuits 27a through 27g receive values (1 or −1) outputted from the selection circuits 24a through 24g, respectively, and output them as the signals s1 through s7, respectively, at timing based on the clock signal clk.

With the above DFE 20 the relationship between the input signal IN and an output signal OUT (signals s1 through s7) is, for example, as follows.

FIG. 12 indicates an example of the relationship between an input and an output of the DFE at the time of n=3.

When the input signal IN indicates 7, all of the signals s1 through s7 are 1. Every time the input signal IN becomes smaller in value by one, the signals s1 through s7 become −1 in order from the signal s1. When the input signal IN indicates 0, all of the signals s1 through s7 are −1.

Because the DFE 20 decides a value of the eight-level PAM input signal IN, the number of second thresholds described above is seven. Furthermore, an offset value based on the magnitude of an ISI corresponding to each of the eight values is added to each second threshold. As a result, the number of third thresholds used as decision thresholds is 56.

When a value of the input signal IN for a UI is decided and values of the input signal IN are "0" through one UI before, it is assumed that the magnitude of ISIs are "−w," "−5w/7," "−3w/7," "−W/7," "+w/7," "+3w/7," "+5w/7," and "+w" respectively. Then the third thresholds are as follows.

Figure 13:
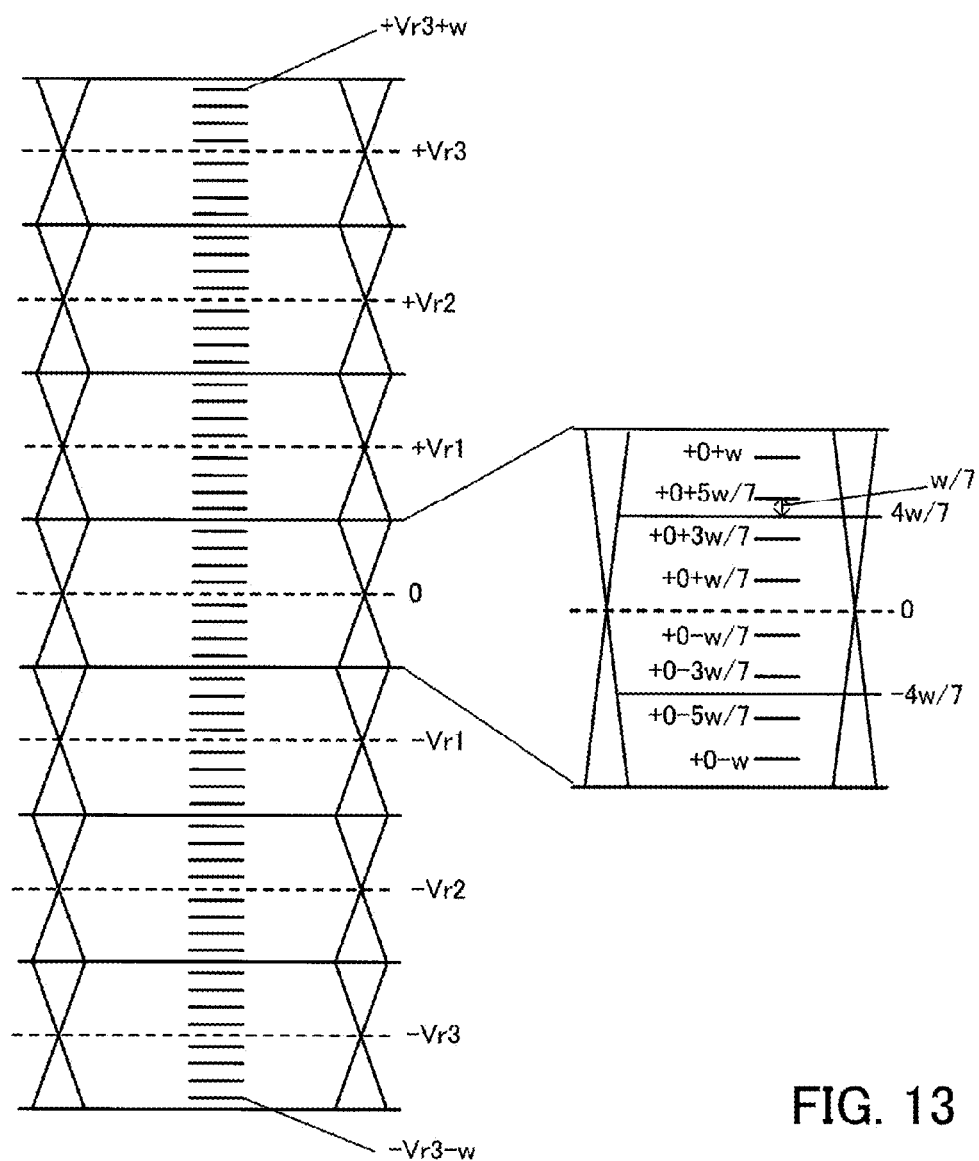
FIG. 13 indicates an example of the relationship at the time of n=3 between an eye pattern of an input signal IN for one UI and second and third thresholds.

FIG. 13 indicates an example of the relationship at the time of n=3 between an eye pattern of the input signal IN for one UI and the second and third thresholds.

In the example of FIG. 13, the second thresholds are −Vr3 through +Vr3 and the number of the second thresholds is seven. The third thresholds −Vr3−w through +Vr3+w are obtained by adding offset values based on the magnitude of the above eight ISIs to the second thresholds. Furthermore, in FIG. 13, the average value 4w/7 of +0+w/7 through +0+w, of the third thresholds obtained by adding the eight offset values to the second threshold "0", which are greater than 0 and the average value −4w/7 of +0−w/7 through +0−w, of the third thresholds obtained by adding the eight offset values to the second threshold "0", which are smaller than 0 are indicated. The difference between the average values and the third thresholds nearest them is w/7.

Detailed descriptions will be omitted. By setting the coefficients c1 and c2, the coefficient b1, and the coefficient b2 indicated in FIG. 11 to w/7, 4w/7, and −4w/7 respectively, however, decision thresholds, of the 56 third thresholds indicated in FIG. 13, set in the comparator circuits 23a1 through 23g2 are generated properly. That is to say, the DFE 20 outputs decision results of the comparator circuits 23a1 through 23g2 in which proper decision thresholds are set according to a value indicated one UI before.

As has been described, the DFE 10 or 20 selectively generates decision thresholds to be used from the 12 or 56 third thresholds based on the number of the values of the PAM input signal IN and the magnitude of the ISIs on the basis of the above average values and an adjustment value based on a past decision result. As a result, when n=2, the number of the comparator circuits 13a1 through 13c2 is not twelve, but six. When n=3, the number of the comparator circuits 23a1 through 23g2 is not fifty-six, but fourteen. This checks an increase in the power consumption of comparator circuits caused by an increase in the number of the values of the PAM input signal IN and also checks an increase in the power consumption of circuits used for driving comparator circuits. That is to say, this checks an increase in the power consumption of the DFE 10 or 20 and the power consumption of an apparatus including the DFE 10 or 20. In addition, this reduces the number of comparator circuits. As a result, an increase in circuit area is checked.

Furthermore, the amount of a change in decision thresholds of the comparator circuits 13a1 through 13c2 or the comparator circuits 23a1 through 23g2 included in the DFE 10 or 20 is small compared with comparator circuits included in a conventional direct feedback DFE. For example, a decision threshold set in the comparator circuit 13b1 included in the DFE 10 is +0+w or +0+w/3 of the third thresholds indicated in FIG. 5. The amount of a change is 2w/3. With a direct feedback DFE in which the tap number is one and which accommodates PAM4, on the other hand, the number of comparator circuits is three and is small. However, each comparator circuit uses four of twelve decision thresholds while making a change. In this case, the amount of a change in decision threshold is 2w and is large.

That is to say, compared with a direct feedback DFE, the DFE 10 or 20 according to the first embodiment accommodates a high data rate input signal IN.

Second Embodiment

Figure 14:
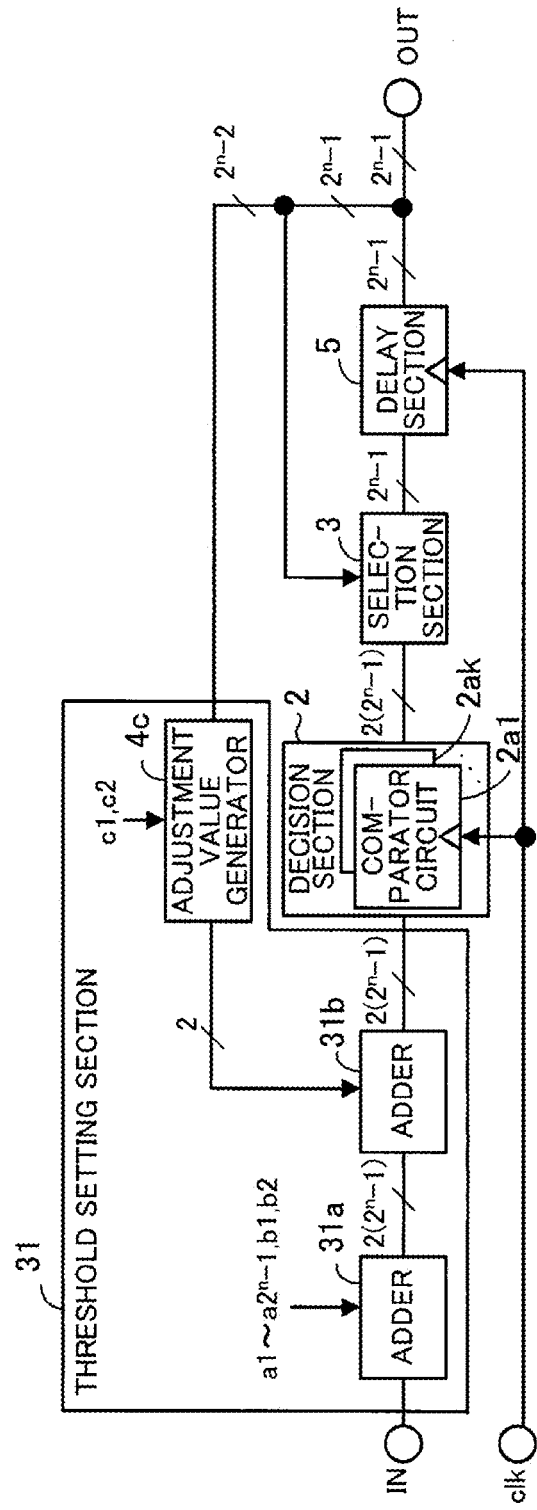
FIG. 14 illustrates an example of a DFE according to a second embodiment.

FIG. 14 illustrates an example of a DFE according to a second embodiment.

Components which are the same as those included in the DFE 1 according to the first embodiment illustrated in FIG. 1 are marked with the same numerals.

A threshold setting section 31 included in a DFE according to a second embodiment differs from the threshold setting section 4 included in the DFE 1 according to the first embodiment.

The threshold setting section 31 includes adders 31a and 31b and an adjustment value generator 4c.

The adder 31a has the function of adding not only coefficients a1 through a2$^n$-1 but also coefficients b1 and b2 described above to an input signal IN. That is to say, the adder 31a combines the functions of the adder 4a and the coefficient adder 4d illustrated in FIG. 1. As a result, the adder 31a outputs 2(2$^n$-1) signals.

The adder 31b adds one of two outputs of the adjustment value generator 4c to half of the outputs of the adder 31a and adds the other of the two outputs of the adjustment value generator 4c to the remaining half of the outputs of the adder 31a. As a result, the adder 31b outputs signals obtained by adding 2(2$^n$-1) decision thresholds to the input signal IN.

Figure 15:
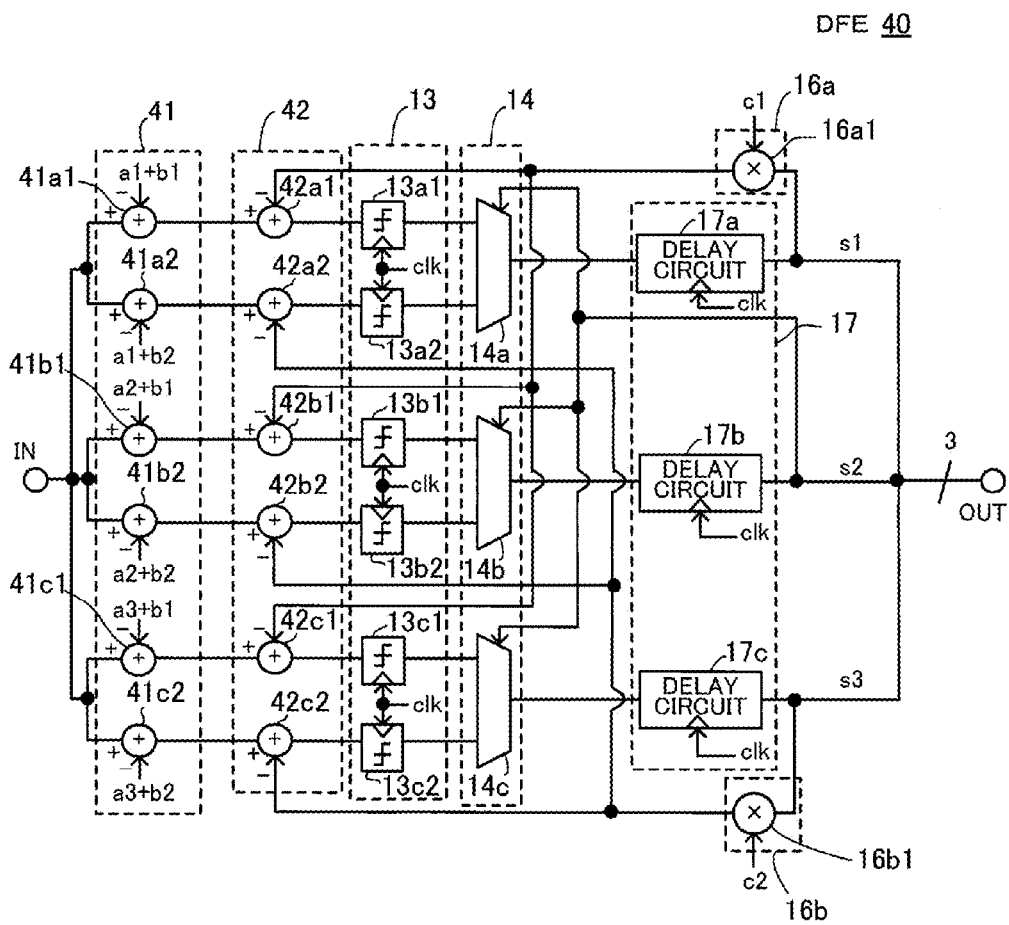
FIG. 15 illustrates an example of the DFE according to the second embodiment at the time of n=2.

FIG. 15 illustrates an example of the DFE according to the second embodiment at the time of n=2. Components which are the same as those included in the DFE 10 illustrated in FIG. 2 are marked with the same numerals.

An addition section 41 of a DFE 40 includes adders 41a1, 41a2, 41b1, 41b2, 41c1, and 41c2. The adder 41a1 subtracts a1+b1 from an input signal IN. The adder 41a2 subtracts a1+b2 from the input signal IN. The adder 41b1 subtracts a2+b1 from the input signal IN. The adder 41b2 subtracts a2+b2 from the input signal IN. The adder 41c1 subtracts a3+b1 from the input signal IN. The adder 41c2 subtracts a3+b2 from the input signal IN. For example, the above values, such as a1+b1 and a1+b2, are supplied from a control section (processor) not illustrated or are stored in advance in a storage section such as a register.

The addition section 42 includes adders 42a1, 42a2, 42b1, 42b2, 42c1, and 42c2. The adder 42a1 subtracts an adjustment value generated by an adjustment value generation section 16a from an output of the adder 41a1. The adder 42a2 subtracts an adjustment value generated by an adjustment value generation section 16b from an output of the adder 41a2. The adder 42b1 subtracts the adjustment value generated by the adjustment value generation section 16a from an output of the adder 41b1. The adder 42b2 subtracts the adjustment value generated by the adjustment value generation section 16b from an output of the adder 41b2. The adder 42c1 subtracts the adjustment value generated by the adjustment value generation section 16a from an output of the adder 41c1. The adder 42c2 subtracts the adjustment value generated by the adjustment value generation section 16b from an output of the adder 41c2.

As a result, the addition section 42 outputs signals obtained by adding six decision thresholds to the input signal IN.

The coefficients a1 through a3 are set to +Vr, 0, and -Vr respectively. The coefficients b1 and b2 are set to +2w/3 and -2w/3 respectively. Coefficients c1 and c2 are set to w/3. This is the same with the DFE 10 illustrated in FIG. 2. By doing so, six decision thresholds are set in comparator circuits 13a1 through 13c2 from among the twelve third thresholds indicated in FIG. 5.

With the above DFE 30 or 40 according to the second embodiment the same effect that is obtained by the DFE 1, 10, or 20 according to the first embodiment is achieved. In addition, with the DFE 30 or 40 according to the second embodiment the number of circuits on the feedback paths is small. With the DFE 10 illustrated in FIG. 2, for example, the adders 15a1 and 15b1 are included on the feedback paths. With the DFE 40 illustrated in FIG. 15, however, they are not included. This enables operation at a higher speed.

Third Embodiment

Figure 16:
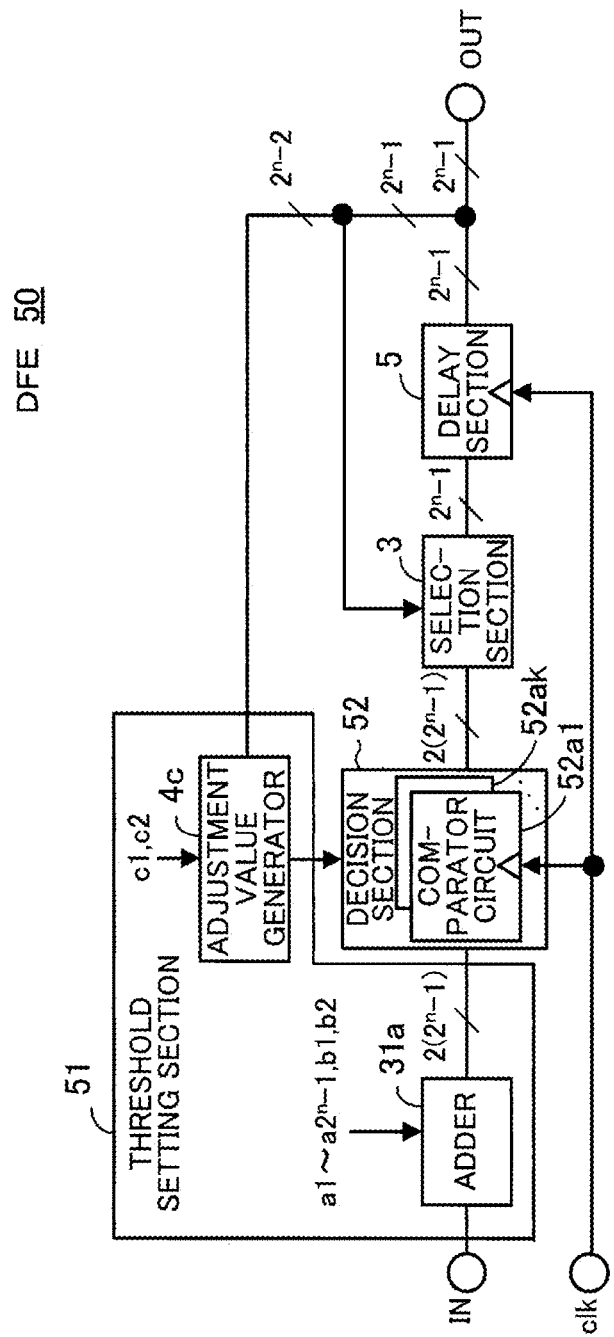
FIG. 16 illustrates an example of a DFE according to a third embodiment.

FIG. 16 illustrates an example of a DFE according to a third embodiment.

Components which are the same as those included in the DFE 30 according to the second embodiment illustrated in FIG. 14 are marked with the same numerals.

A threshold setting section 51 and a decision section 52 included in a DFE 50 according to a third embodiment differ from the threshold setting section 31 and the decision section 2, respectively, included in the DFE 30 according to the second embodiment.

As stated above, the comparator circuits 2a1 through 2ak included in the decision section 2 compare at timing based on a clock signal clk 0 and input signals IN to which decision thresholds have been added. By doing so, the comparator circuits 2a1 through 2ak equivalently output comparison results of comparisons between the input signal IN and the decision thresholds. With the decision section 52 included in the DFE 50 according to the third embodiment, on the other hand, comparator circuits 52a1 through 52ak each having a decision threshold change function are used.

The comparator circuits 52a1 through 52ak receive signals obtained by adding coefficients a1 through a2$^n$-1, b1, and b2 to the input signal IN by an adder 31a, and set 2(2$^n$-1) decision thresholds on the basis of adjustment values generated by an adjustment value generator 4c.

Figure 17:
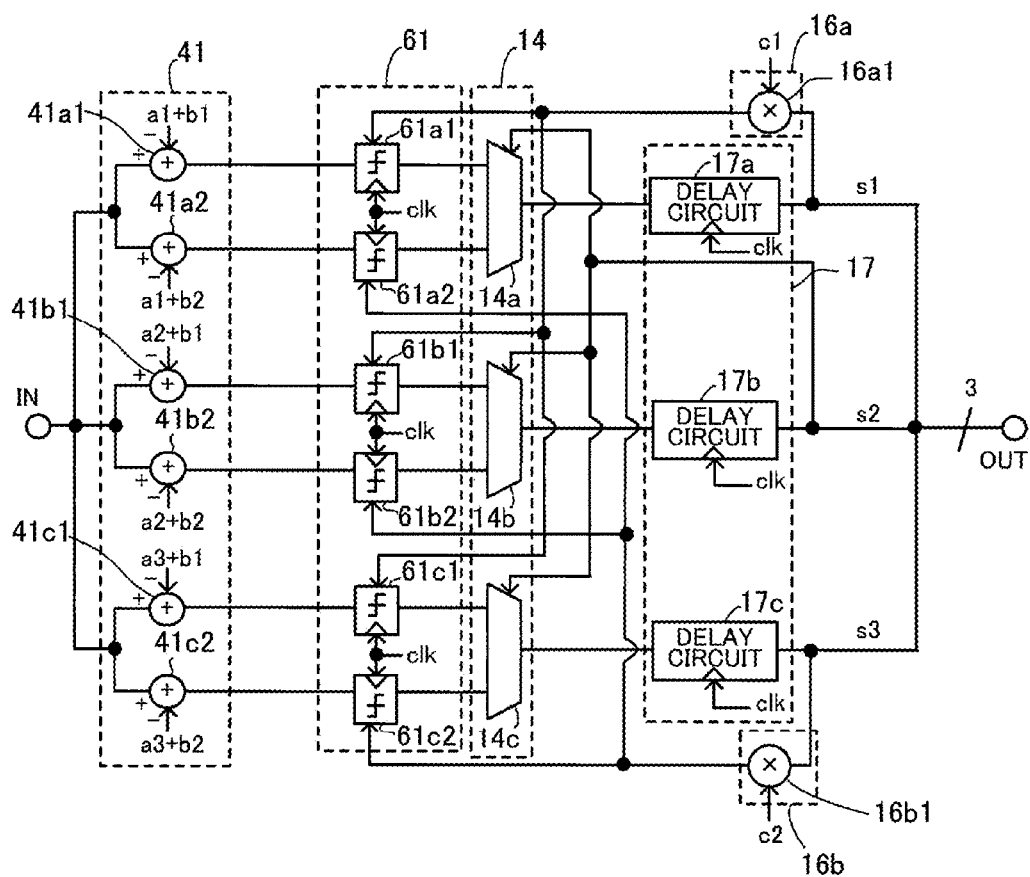
FIG. 17 illustrates an example of the DFE according to the third embodiment at the time of n=2.

FIG. 17 illustrates an example of the DFE according to the third embodiment at the time of n=2. Components which are the same as those included in the DFE illustrated in FIG. 15 are marked with the same numerals.

A decision section 61 of a DFE 60 includes comparator circuits 61a1, 61a2, 61b1, 61b2, 61c1, and 61c2.

The comparator circuit 61a1 sets a decision threshold on the basis of a signal obtained by subtracting a1+b1 from an input signal IN by an adder 41a1 and an adjustment value generated by an adjustment value generation section 16a. The comparator circuit 61a2 sets a decision threshold on the basis of a signal obtained by subtracting a1+b2 from the input signal IN by an adder 41a2 and an adjustment value generated by an adjustment value generation section 16b. The comparator circuit 61b1 sets a decision threshold on the basis of a signal obtained by subtracting a2+b1 from the input signal IN by an adder 41b1 and the adjustment value generated by the adjustment value generation section 16a. The comparator circuit 61b2 sets a decision threshold on the basis of a signal obtained by subtracting a2+b2 from the input signal IN by an adder 41b2 and the adjustment value generated by the adjustment value generation section 16b. The comparator circuit 61c1 sets a decision threshold on the basis of a signal obtained by subtracting a3+b1 from the input signal IN by an adder 41c1 and the adjustment value generated by the adjustment value generation section 16a. The comparator circuit 61c2 sets a decision threshold on the basis of a signal obtained by subtracting a3+b2 from the input signal IN by an adder 41c2 and the adjustment value generated by the adjustment value generation section 16b.

The coefficients a1 through a3 are set to +Vr, 0, and -Vr respectively. The coefficients b1 and b2 are set to +2w/3 and -2w/3 respectively. Coefficients c1 and c2 are set to w/3. This is the same with the DFE 10 illustrated in FIG. 2. By doing so, six decision thresholds are set in the comparator circuits 61a1 through 61c2 from among the twelve third thresholds indicated in FIG. 5.

With the above DFE 50 or 60 according to the third embodiment the same effect that is obtained by the DFE 30 or 40 according to the second embodiment is achieved.

If each of the comparator circuits 2a1 through 2ak of the DFE 1 according to the first embodiment illustrated in FIG. 1 also has a decision threshold change function, then signals outputted from the coefficient adder 4d may be supplied to the comparator circuits $2a1$ through $2ak$ to change decision thresholds. In that case, the adder $4b$ is needless.

Fourth Embodiment

Figure 18:
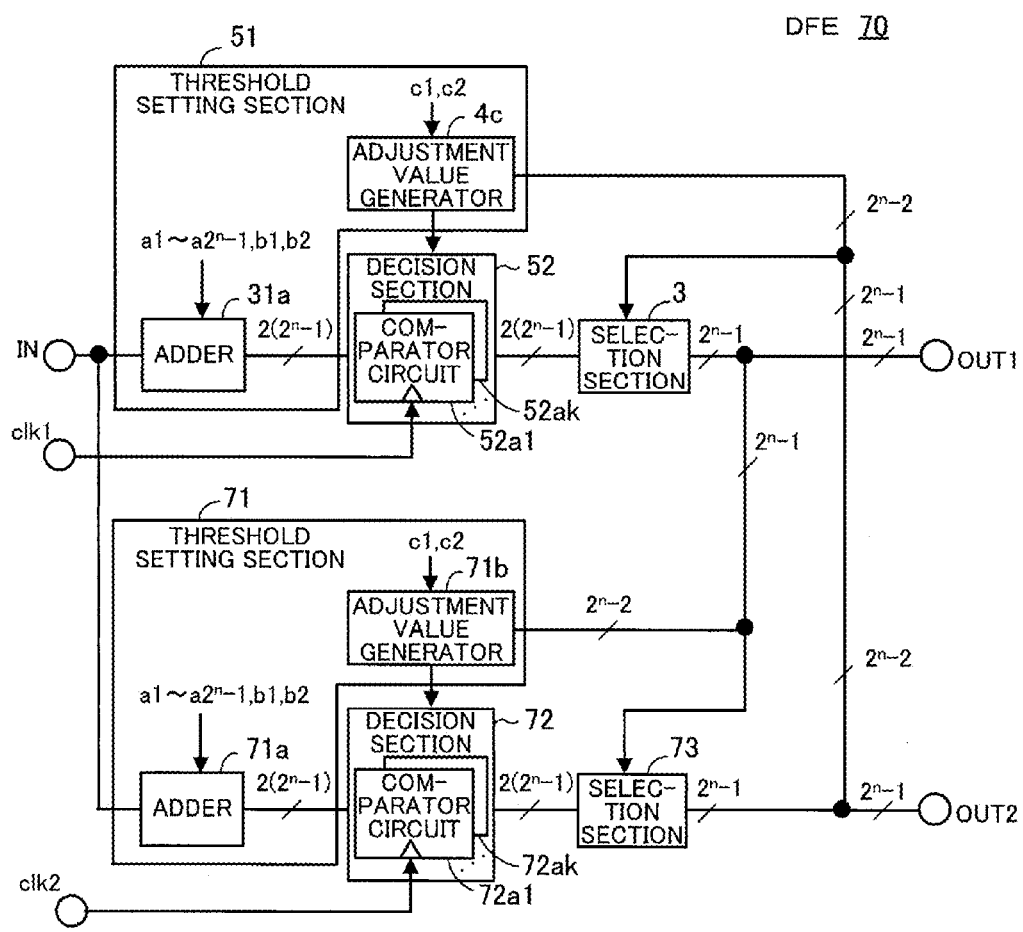
FIG. 18 illustrates an example of a DFE according to a fourth embodiment.

FIG. 18 illustrates an example of a DFE according to a fourth embodiment.

Components which are the same as those included in the DFE 50 according to the third embodiment illustrated in FIG. 16 are marked with the same numerals.

A DFE 70 according to a fourth embodiment includes a threshold setting section 51, a decision section 52, a selection section 3, a threshold setting section 71, a decision section 72, and a selection section 73. The threshold setting section 51, the decision section 52, and the selection section 3 are the same as the threshold setting section 71, the decision section 72, and the selection section 73, respectively, as components. The DFE 70 performs a process by a two-parallel time-interleaving system. The DFE 70 does not include a delay section 5 like that illustrated in FIG. 16. However, the DFE 70 may include a delay section 5.

The threshold setting section 71 includes an adder $71a$ and an adjustment value generator $71b$ which have the functions of an adder $31a$ and an adjustment value generator $4c$ respectively. The adder $71a$ adds coefficients a1 through $a2^n-1$, b1, and b2 to an input signal IN. The adjustment value generator $71b$ generates an adjustment value on the basis of part $((2^n-2)$ bits) of bits indicative of a past decision result outputted from the selection section 3 and coefficients c1 and c2.

The decision section 72 includes comparator circuits $72a1$ through $72ak$ having the same functions as comparator circuits $52a1$ through $52ak$ included in the decision section 52 have. In order to realize the time-interleaving system, clock signals clk1 and clk2 which differ in phase are inputted to the comparator circuits $52a1$ through $52ak$ of the decision section 52 and the comparator circuits $72a1$ through $72ak$ of the decision section 72 respectively. That is to say, comparison timings differ.

For example, if the phase of the clock signal clk1 is considered as reference (0 degree), there is a phase difference of 180 degrees between the clock signals clk1 and clk2.

The selection section 73 inputs as a control signal one bit of a decision result outputted from the selection section 3. On the basis of the control signal, the selection section 73 selects $2^n-1$ signals from among $2(2^n-1)$ signals outputted from the comparator circuits $72a1$ through $72ak$ and outputs them as an output signal OUT2.

The selection section 3 inputs as a control signal one bit of a decision result outputted from the selection section 73. On the basis of the control signal, the selection section 3 selects $2^n-1$ signals from among $2(2^n-1)$ signals outputted from the comparator circuits $52a1$ through $52ak$ and outputs them as an output signal OUT1.

The adjustment value generator $4c$ of the threshold setting section 51 generates an adjustment value on the basis of part $((2^n-2)$ bits) of bits indicative of a decision result outputted from the selection section 73 and the coefficients c1 and c2.

Figure 19:
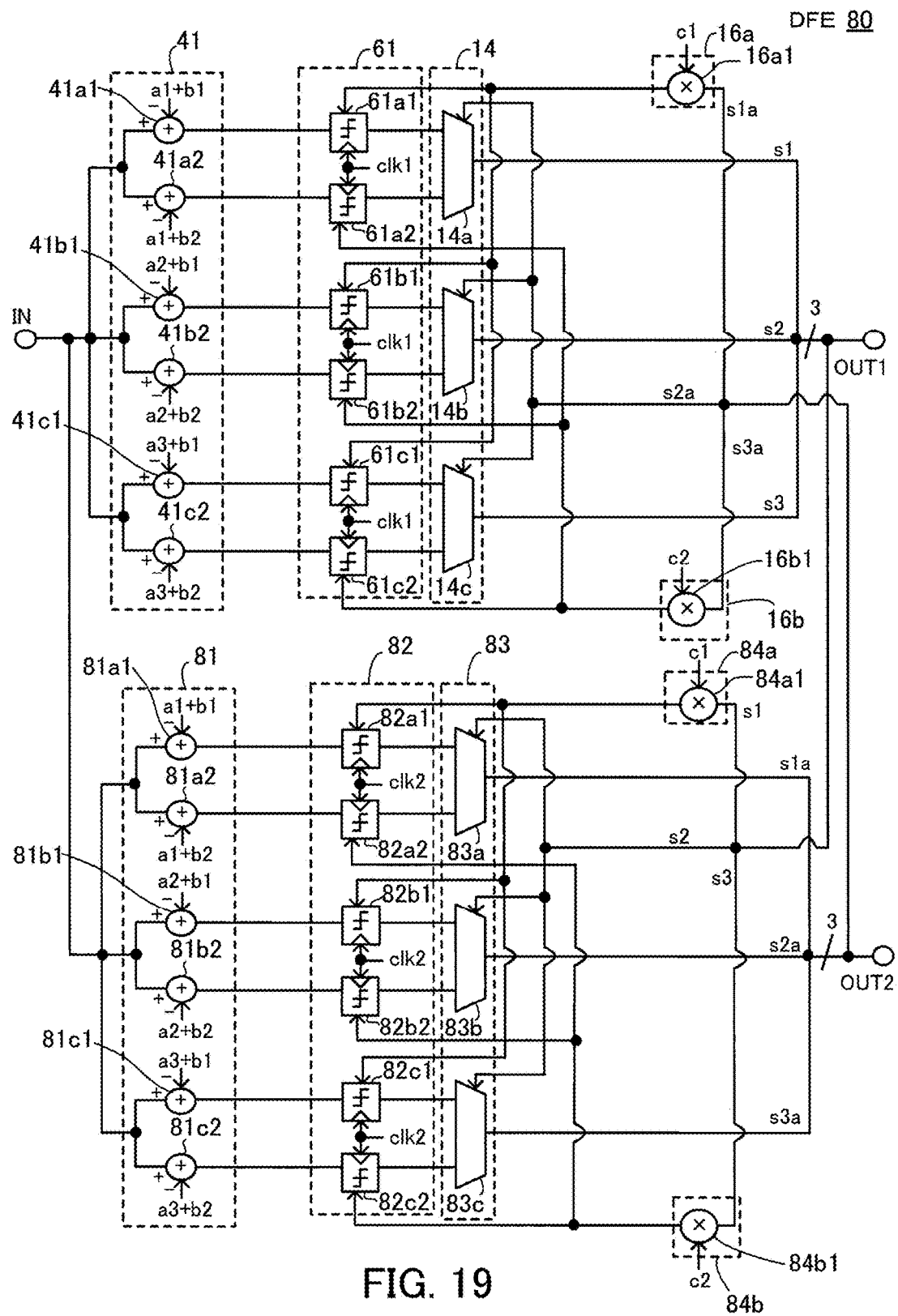
FIG. 19 illustrates an example of the DFE according to the fourth embodiment at the time of n=2.

FIG. 19 illustrates an example of the DFE according to the fourth embodiment at the time of n=2. Components which are the same as those included in the DFE illustrated in FIG. 17 are marked with the same numerals.

A DFE 80 illustrated in FIG. 19 includes an addition section 41, a decision section 61, a selection section 14, adjustment value generation sections $16a$ and $16b$, an addition section 81, a decision section 82, a selection section 83, and adjustment value generation sections $84a$ and $84b$. The addition section 41, the decision section 61, the selection section 14, and the adjustment value generation sections $16a$ and $16b$ are the same as the addition section 81, the decision section 82, the selection section 83, and the adjustment value generation sections $84a$ and $84b$, respectively, as components.

The addition section 81 includes adders $81a1$, $81a2$, $81b1$, $81b2$, $81c1$, and $81c2$. The adders $81a1$, $81a2$, $81b1$, $81b2$, $81c1$, and $81c2$ perform the same operations as adders $41a1$, $41a2$, $41b1$, $41b2$, $41c1$, and $41c2$, respectively, perform.

The decision section 82 includes comparator circuits $82a1$, $82a2$, $82b1$, $82b2$, $82c1$, and $82c2$. The comparator circuits $82a1$, $82a2$, $82b1$, $82b2$, $82c1$, and $82c2$ perform the same processes as comparator circuits $61a1$, $61a2$, $61b1$, $61b2$, $61c1$, and $61c2$, respectively, perform. In order to realize the time-interleaving system, clock signals clk1 and clk2 which differ in phase are inputted to the comparator circuits $61a1$ through $61c2$ and the comparator circuits $82a1$ through $82c2$ of the decision section 72 respectively. That is to say, comparison timings differ.

For example, if the phase of the clock signal clk1 is considered as reference (0 degree), there is a phase difference of 180 degrees between the clock signals clk1 and clk2.

The selection section 83 includes selection circuits $83a$, $83b$, and $83c$. The selection circuits $83a$, $83b$, and $83c$ have the same functions as selection circuits $14a$, $14b$, and $14c$, respectively, have. However, the selection circuits $83a$ through $83c$ input a signal s2 outputted from the selection circuit $14b$ as a control signal. On the basis of the control signal, the selection circuits $83a$ through $83c$ select three signals from among six signals outputted from the comparator circuits $82a1$ through $82c2$. As a result, an output signal OUT2 containing signals $s1a$, $s2a$, and $s3a$ is outputted. The selection circuits $14a$ through $14c$ of the selection section 14 input the signal $s2a$ outputted from the selection circuit $83b$ as a control signal. On the basis of the control signal, the selection circuits $14a$ through $14c$ select three signals from among six signals outputted from the comparator circuits $61a1$ through $61c2$. As a result, an output signal OUT1 containing signals s1 and s3 and the signal s2 is outputted.

The adjustment value generation section $84a$ includes a multiplier $84a1$ and generates an adjustment value by multiplying the signal s1 by a coefficient c1. The adjustment value generation section $84b$ includes a multiplier $84b1$ and generates an adjustment value by multiplying the signal s3 by a coefficient c2. On the other hand, the adjustment value generation section $16a$ generates an adjustment value by multiplying the signal $s1a$ by the coefficient c1, and the adjustment value generation section $16b$ generates an adjustment value by multiplying the signal $s3a$ by the coefficient c2.

With the above DFE 80 decision thresholds set in the comparator circuits $61a1$ through $61c2$ are adjusted on the basis of the signals $s1a$ and $s3a$ and decision thresholds set in the comparator circuits $82a1$ through $82c2$ are adjusted on the basis of the signals s1 and s3. Furthermore, the output signals OUT1 and OUT2 are outputted alternately at timing based on the clock signals clk1 and clk2.

With the above DFE 70 or 80 according to the fourth embodiment the same effect that is obtained by the DFE 50 or 60 according to the third embodiment is achieved. In addition, even if the clock signals clk1 and clk2 are equal in frequency to a clock signal clk which makes the DFE 50 or 60 operate, the value of a higher data rate input signal IN can be decided by performing a two-parallel process like the DFE 70 or 80.

In the above description a case where the DFE 50 or 60 according to the third embodiment is changed to a circuit corresponding to the two-parallel time-interleaving system is taken as an example. Similarly, the DFE 1, 10, or 20 according to the first embodiment or the DFE 30 or 40 according to the second embodiment may be changed to a circuit corresponding to the two-parallel time-interleaving system.

Furthermore, a circuit corresponding to a three or more parallel time-interleaving system may be used.

Fifth Embodiment

Figure 20:
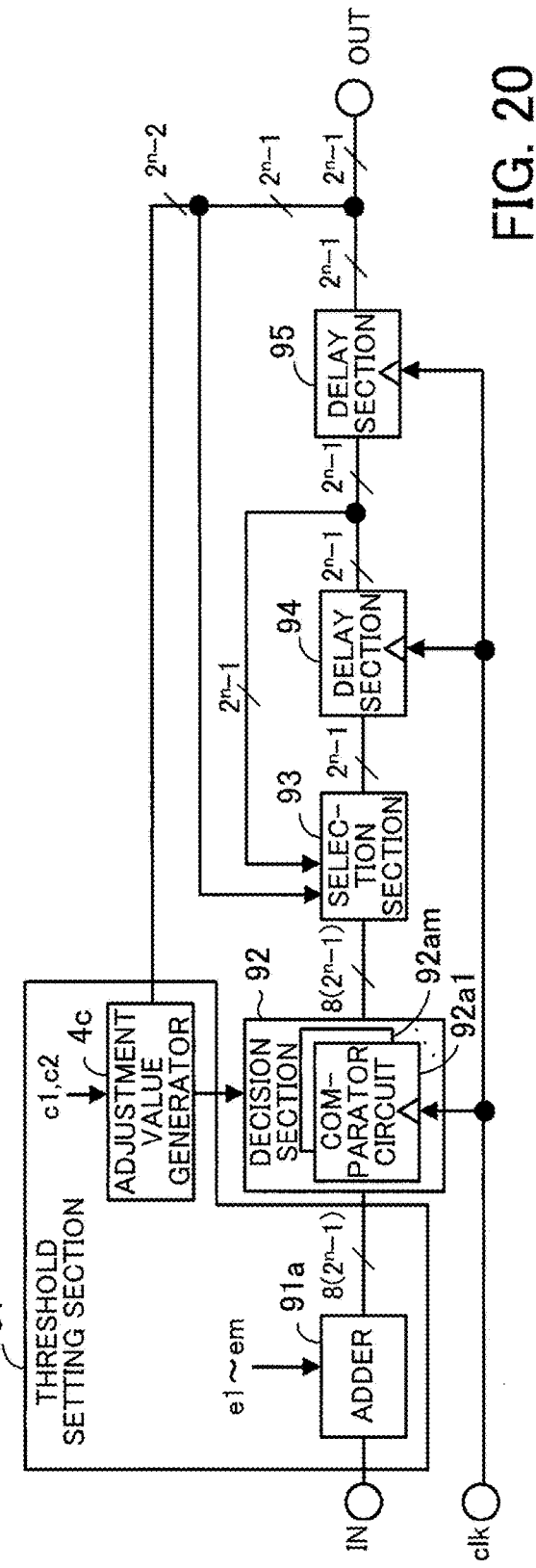
FIG. 20 illustrates an example of a DFE according to a fifth embodiment.

FIG. 20 illustrates an example of a DFE according to a fifth embodiment.

Components which are the same as those included in the DFE 50 according to the third embodiment illustrated in FIG. 16 are marked with the same numerals.

A DFE 90 according to a fifth embodiment is a 2-tap DFE.

An adder 91a of a threshold setting section 91 of the DFE 90 adds coefficients e1 through em to an n-level input signal IN. The coefficients e1 through em are obtained by adding a coefficient based on an average value of third thresholds corresponding to taps to the above coefficients a1 through a$2^n$−1 respectively. If the DFE 90 is a 2-tap DFE, m=8(2n−1).

A decision section 92 includes comparator circuits 92a1 through 92am each having a decision threshold change function.

The comparator circuits 92a1 through 92am set 8($2^n$−1) decision thresholds on the basis of signals obtained by adding the coefficients e1 through em to the input signal IN by the adder 91a and an adjustment value generated by an adjustment value generator 4c.

A selection section 93 inputs as a control signal a decision result of a value of the input signal IN delayed by a delay section 94. In addition, the selection section 93 inputs as a control signal a decision result of a value of the input signal IN delayed by the delay section 94 and a delay section 95. On the basis of these control signals, the selection section 93 selects one of comparison results outputted from the comparator circuits 92a1 through 92am, and outputs it as a decision result of a value of the input signal IN. The selection section 93 uses as a control signal one signal, of ($2^n$−1) signals indicative of decision results outputted from the delay section 95, which indicates that a decision result is greater than or equal to $2^{n-1}$ or smaller than $2^{n-1}$. The other ($2^n$−2) signals are used by the threshold setting section 91 for generating decision thresholds.

Each of the delay sections 94 and 95 includes, for example, D flip-flops and outputs a decision result of the input signal IN every UI at timing based on a clock signal clk. An output of the delay section 95 is an output signal OUT of the DFE 90.

Figure 21:
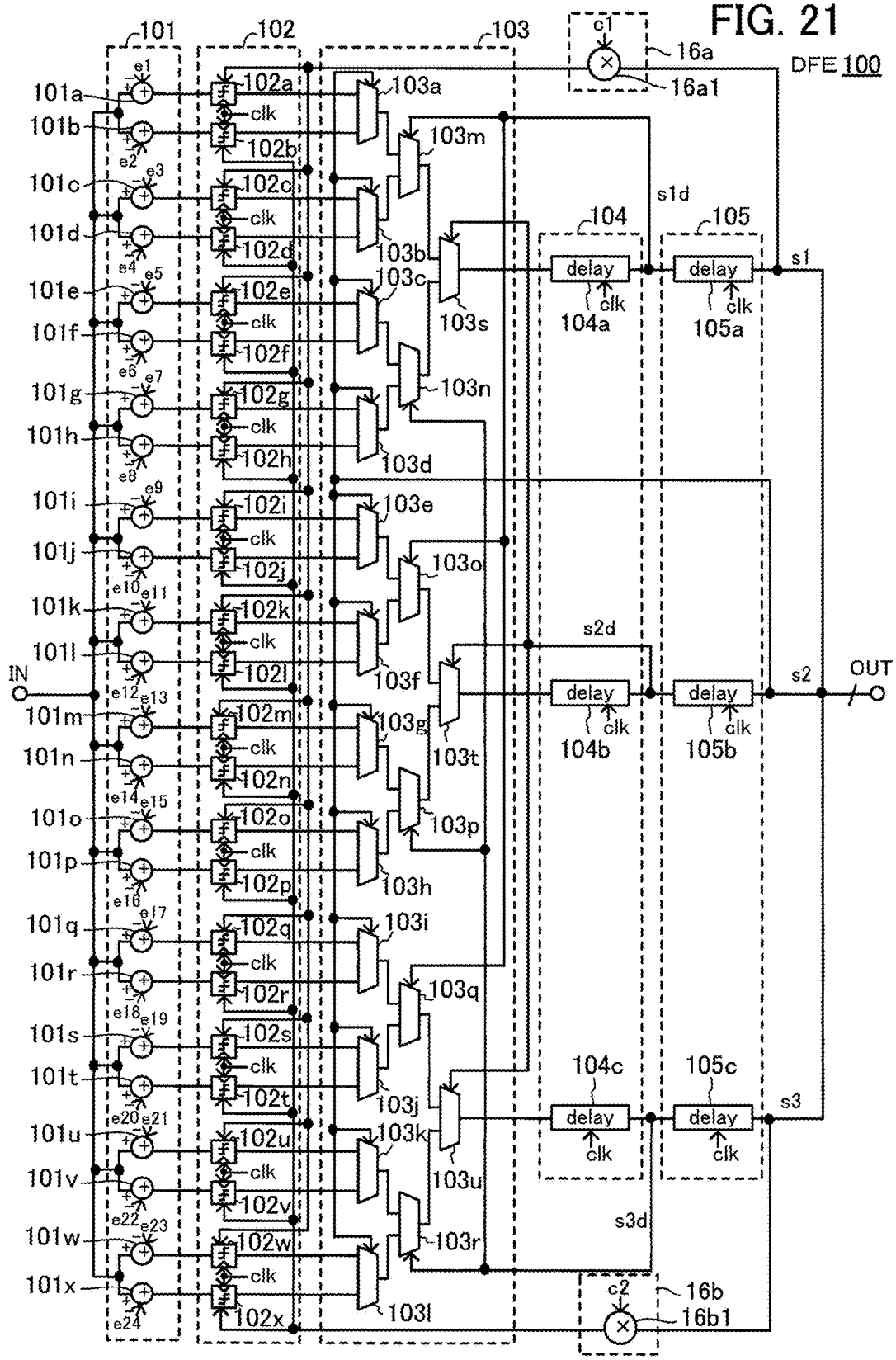
FIG. 21 illustrates an example of the DFE according to the fifth embodiment at the time of n=2.

FIG. 21 illustrates an example of the DFE according to the fifth embodiment at the time of n=2. Components which are the same as those included in the DFE illustrated in FIG. 17 are marked with the same numerals.

An addition section 101 includes adders 101a through 101x. Each of the adders 101a through 101x subtracts one of coefficients e1 through e24 from an input signal IN.

A decision section 102 includes comparator circuits 102a through 102x and outputs comparison results of comparisons between decision thresholds determined on the basis of signals obtained by subtracting the coefficients e1 through e24 from the input signal IN by the adders 101a through 101x respectively and an adjustment value generated by an adjustment value generation section 16a and the input signal IN.

A selection section 103 includes selection circuits 103a through 103u.

Of three signals s1, s2, and s3 indicative of decision results of a value of the input signal IN outputted from a delay section 105, the selection circuits 103a through 103l input the signal s2 as a control signal. Furthermore, on the basis of a value of the signal s2, the selection circuits 103a through 103l select comparison results from among the comparison results outputted from the comparator circuits 102a through 102x.

Of signals s1d, s2d, and s3d outputted from a delay section 104, the selection circuits 103m, 103o, and 103q input the signal s1d as a control signal. Furthermore, on the basis of a value of the signal s1d, the selection circuits 103m, 103o, and 103q select one of outputs of the selection circuits 103a and 103b, one of outputs of the selection circuits 103e and 103f, and one of outputs of the selection circuits 103i and 103j respectively. For example, when (signal s1d)=1, the selection circuit 103m selects an output of the selection circuit 103a. When (signal s1d)=−1, the selection circuit 103m selects an output of the selection circuit 103b.

Of the signals s1d, s2d, and s3d, the selection circuits 103n, 103p, and 103r input the signal s3d as a control signal. Furthermore, on the basis of a value of the signal s3d, the selection circuits 103n, 103p, and 103r select one of outputs of the selection circuits 103c and 103d, one of outputs of the selection circuits 103g and 103h, and one of outputs of the selection circuits 103k and 103l respectively. For example, when (signal s3d)=1, the selection circuit 103n selects an output of the selection circuit 103c. When (signal s3d)=−1, the selection circuit 103n selects an output of the selection circuit 103d.

Of the signals s1d, s2d, and s3d, the selection circuits 103s, 103t, and 103u input the signal s2d as a control signal. Furthermore, on the basis of a value of the signal s2d, the selection circuits 103s, 103t, and 103u select one of outputs of the selection circuits 103m and 103n, one of outputs of the selection circuits 103o and 103p, and one of outputs of the selection circuits 103q and 103r respectively. For example, when (signal s2d)=1, the selection circuit 103s selects an output of the selection circuit 103m. When (signal s2d)=−1, the selection circuit 103s selects an output of the selection circuit 103n.

The delay section 104 includes delay circuits (indicated by "delay" in FIGS. 21) 104a, 104b, and 104c. The delay circuits 104a through 104c are, for example, D flip-flops and output decision results (signals s1d, s2d, and s3d) of the input signal IN outputted from the selection circuits 103s, 103t, and 103u, respectively, every UI at timing based on a clock signal clk.

The delay section 105 includes delay circuits (indicated by "delay" in FIGS. 21) 105a, 105b, and 105c. The delay circuits 105a through 105c are, for example, D flip-flops, receive the signals s1d through s3d, and output the signals s1, s2, and s3, respectively, every UI at timing based on the clock signal clk.

With the above 2-tap DFE 90 or 100 the same effect that is obtained by the DFE 50 or 60 according to the third embodiment is also achieved.

In the above description a case where the DFE 50 or 60 according to the third embodiment is changed to the 2-tap DFE is taken as an example. Similarly, the DFE 1, 10, or 20 according to the first embodiment, the DFE 30 or 40 according to the second embodiment, or the DFE 70 or 80 according to the fourth embodiment may be changed to a 2-tap DFE.

Furthermore, each of the above DFEs may be changed to a DFE including three or more taps.

(Receiver Circuit)

Each of the above DFEs 1 through 100 is applicable to, for example, the following receiver circuit.

Figure 22:
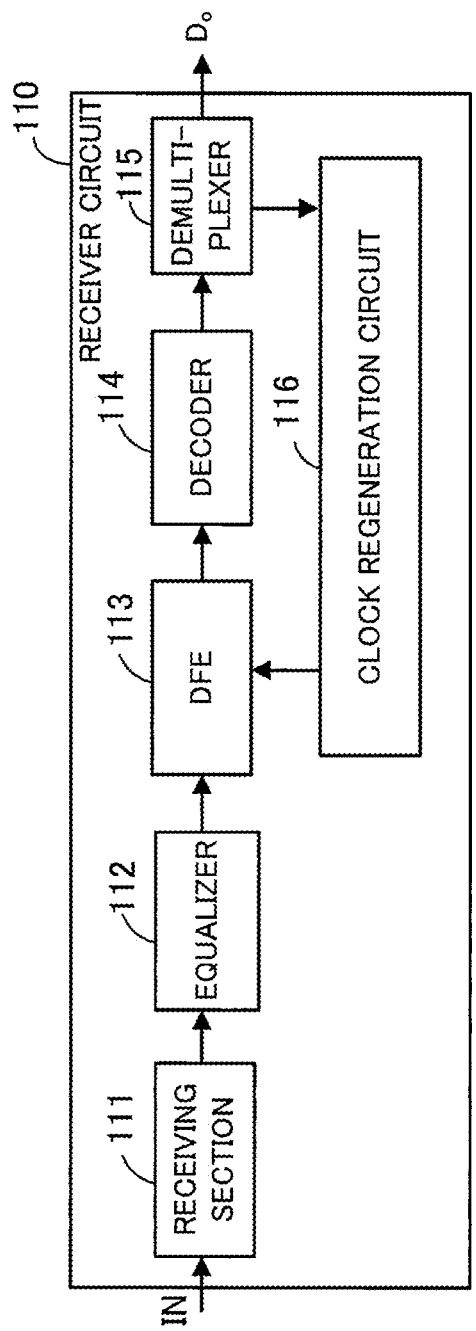
FIG. 22 illustrates an example of a receiver circuit.

FIG. 22 illustrates an example of a receiver circuit.

A receiver circuit 110 includes a receiving section 111, an equalizer 112, a DFE 113, a decoder 114, a demultiplexer 115, and a clock regeneration circuit 116.

The receiving section 111 receives an input signal IN. The equalizer 112 performs an equalization process on the input signal IN.

One of the above DFEs 1 through 100 is used as the DFE 113. The DFE 113 outputs a decision result of a value of the input signal IN.

The decoder 114 decodes signals s1 through s3 outputted from the DFE 113. The demultiplexer 115 demultiplexes decoding results and outputs them as an output data signal Do.

Furthermore, on the basis of the output data signal Do, the clock regeneration circuit 116 regenerates a clock signal clk and supplies it to the DFE 113.

By using one of the above DFEs 1 through 100 as the DFE 113 of the receiver circuit 110, the power consumption of the receiver circuit 110 is reduced. The reason for this is as follows. Because the number of comparator circuits included in the DFE 113 is reduced, the power consumption of the comparator circuits and the power consumption of the clock regeneration circuit 116 and the like which drive the comparator circuits are reduced.

An aspect of the DFE and receiver circuit of the present disclosure has been described on the basis of the embodiments. However, they are simple examples and the present invention is not limited to the above descriptions.

For example, when an input signal IN is a differential input signal, circuit structure by which each value of the differential input signal is decided is adopted.

According to the disclosed decision feedback equalizer and receiver circuit, an increase in power consumption is checked.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A decision feedback equalizer comprising:
   a plurality of comparator circuits which output comparison results of comparisons between a pulse amplitude modulated input signal with four or more values and a plurality of first thresholds;
   a selection section which decides a value of the input signal at first timing by selecting one of the comparison results outputted from the plurality of comparator circuits on the basis of a decision result of a value of the input signal at second timing before the first timing; and
   a threshold setting section which generates the plurality of first thresholds from a plurality of third thresholds obtained by adding an offset value based on a magnitude of an inter-symbol interference corresponding to each of the values to one of a plurality of second thresholds whose number is based on a number of the values, based on a first average value of the plurality of third thresholds greater than a second threshold or a second average value of the plurality of third thresholds smaller than the second threshold and an adjustment value based on the decision result and which sets the plurality of first thresholds in the plurality of comparator circuits.

2. The decision feedback equalizer according to claim 1, wherein the threshold setting section includes:
   an adjustment value generator which generates the adjustment value, based on the decision result and a first coefficient whose magnitude is half of the resolution of the plurality of third thresholds;
   a first adding section which adds the second thresholds to the input signal to output a plurality of first output signals;
   a coefficient adding section which adds two second coefficients based on the first average value and the second average value, respectively, to the adjustment value to output two second output signals; and
   a second adding section which adds the two second output signals to each of the plurality of first output signals and supplies signals obtained to the plurality of comparator circuits to set in the plurality of comparator circuits the plurality of first thresholds that shift from each of the first average value and the second average value by a magnitude of the adjustment value.

3. The decision feedback equalizer according to claim 1, wherein the threshold setting section includes:
   an adjustment value generator which generates the adjustment value on the basis of the decision result and a first coefficient whose magnitude is half of the resolution of the plurality of third thresholds;
   a first adding section which adds the second thresholds and a plurality of third coefficients based on two second coefficients based on the first average value and the second average value, respectively, to the input signal to output a plurality of first output signals; and
   a second adding section which adds the adjustment value to each of the plurality of first output signals and supplies signals obtained to the plurality of comparator circuits to set in the plurality of comparator circuits the plurality of first thresholds that shift from each of the first average value and the second average value by a magnitude of the adjustment value.

4. The decision feedback equalizer according to claim 1, wherein the threshold setting section includes:
   an adjustment value generator which generates the adjustment value, based on the decision result and a first coefficient whose magnitude is half of the resolution of the plurality of third thresholds and which supplies the adjustment value to the plurality of comparator circuits; and
   an adder which adds the second thresholds and a plurality of third coefficients based on two second coefficients based on the first average value and the second average value, respectively, to the input signal and supplies signals obtained to the plurality of comparator circuits to set in the plurality of comparator circuits the plurality of first thresholds that shift from each of the first average value and the second average value by a magnitude of the adjustment value.

5. A receiver circuit comprising:
a receiving section which receives a pulse amplitude modulated input signal with four or more values; and
a decision feedback equalizer including:
   a plurality of comparator circuits which output comparison results of comparisons between the input signal and a plurality of first thresholds;
   a selector which decides a value of the input signal at first timing by selecting one of the comparison results outputted from the plurality of comparator circuits on the basis of a decision result of a value of the input signal at second timing before the first timing; and
   a threshold setter which generates the plurality of first thresholds from a plurality of third thresholds obtained by adding an offset value based on a magnitude of an inter-symbol interference corresponding to each of the values to one of a plurality of second thresholds whose number is based on a number of the values, based on a first average value of the plurality of third thresholds greater than a second threshold or a second average value of the plurality of third thresholds smaller than the second threshold and an adjustment value based on the decision result and which sets the plurality of first thresholds in the plurality of comparator circuits.

* * * * *